US012378897B2

(12) United States Patent
Kameda et al.

(10) Patent No.: US 12,378,897 B2
(45) Date of Patent: Aug. 5, 2025

(54) CASING AND AXIAL FLOW ROTATING MACHINE

(71) Applicant: MITSUBISHI HEAVY INDUSTRIES, LTD., Tokyo (JP)

(72) Inventors: Takuro Kameda, Tokyo (JP); Yasunori Nishioka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/099,581

(22) Filed: Jan. 20, 2023

(65) Prior Publication Data

US 2023/0287804 A1 Sep. 14, 2023

(30) Foreign Application Priority Data

Jan. 27, 2022 (JP) ................................ 2022-010984

(51) Int. Cl.
*F01D 25/24* (2006.01)

(52) U.S. Cl.
CPC ........ *F01D 25/243* (2013.01); *F05D 2220/32* (2013.01); *F05D 2240/14* (2013.01)

(58) Field of Classification Search
CPC .... F01D 25/243; F01D 25/265; F01D 25/285; F01D 25/162; F01D 25/30; F01D 25/28; F01D 25/24; F04D 29/40; F04D 29/403; F04D 29/406; F04D 29/42; F04D 29/4206; F04D 29/4226; F04D 29/424; F05D 2230/50; F05D 2230/51; F05D 2230/642; F05D 2230/644; F05D 2260/31
See application file for complete search history.

(56) References Cited

U.S. PATENT DOCUMENTS

| | | | | |
|---|---|---|---|---|
| 8,092,161 B2 * | 1/2012 | Cai | F01D 25/145 415/114 |
| 8,544,598 B2 * | 10/2013 | Gaudry | F02C 7/045 415/119 |
| 8,568,094 B2 * | 10/2013 | Arase | F01D 25/243 415/214.1 |
| 8,672,609 B2 * | 3/2014 | Lussier | F01D 25/243 415/197 |
| 8,864,459 B2 * | 10/2014 | Casavant | F01D 25/243 415/213.1 |

(Continued)

FOREIGN PATENT DOCUMENTS

| | | |
|---|---|---|
| JP | 2016-113992 | 6/2016 |
| JP | 2020-101145 | 7/2020 |

*Primary Examiner* — Courtney D Heinle
*Assistant Examiner* — Behnoush Haghighian
(74) *Attorney, Agent, or Firm* — Wenderoth, Lind & Ponack, L.L.P.

(57) ABSTRACT

A casing of the present disclosure includes a casing main body and a connecting flange. The casing main body covers an outer circumferential side of a rotor that rotates about an axis. The connecting flange extends from an outer circumferential portion of the casing main body toward the outer circumferential side, is provided along a circumferential direction around the axis and is connected to a member other than the connecting flange in an axial direction that is an extension direction of the axis. The connecting flange is cut out in an upper end portion or a horizontal end portion of the connecting flange.

14 Claims, 14 Drawing Sheets

(56) References Cited

U.S. PATENT DOCUMENTS

| | | | | |
|---|---|---|---|---|
| 8,894,359 | B2 * | 11/2014 | Munshi | F01D 25/08 415/142 |
| 9,140,135 | B2 * | 9/2015 | Robertson, Jr. | F01D 25/243 |
| 9,664,062 | B2 * | 5/2017 | Munshi | F01D 25/08 |
| 9,816,397 | B2 * | 11/2017 | Colson | F01D 17/105 |
| 9,951,649 | B2 * | 4/2018 | Fryer | F02C 7/232 |
| 10,094,285 | B2 * | 10/2018 | Munshi | F01D 25/162 |
| 10,227,892 | B2 * | 3/2019 | Fryer | F01D 25/04 |
| 10,233,780 | B2 * | 3/2019 | Ivanov | B23K 9/007 |
| 10,352,238 | B2 * | 7/2019 | Scott | F01D 5/066 |
| 10,359,051 | B2 * | 7/2019 | Gage | F04D 29/284 |
| 10,507,904 | B2 * | 12/2019 | Scott | B64C 11/14 |
| 10,648,360 | B1 * | 5/2020 | Musil | F02B 37/24 |
| 11,125,113 | B2 * | 9/2021 | Nishioka | F01D 25/243 |
| 11,181,113 | B2 * | 11/2021 | Mizunoue | F04D 29/4206 |
| 11,674,548 | B2 * | 6/2023 | Davis | F01D 25/164 415/229 |
| 11,821,387 | B2 * | 11/2023 | Conete | F02K 1/04 |
| 11,905,925 | B2 * | 2/2024 | Schroer | F16D 1/108 |
| 2010/0296926 | A1 * | 11/2010 | Arase | F02C 3/14 415/214.1 |
| 2012/0076647 | A1 * | 3/2012 | Robertson, Jr. | F02K 3/06 415/182.1 |
| 2013/0058780 | A1 * | 3/2013 | Casavant | F01D 25/243 29/889.22 |
| 2013/0149107 | A1 * | 6/2013 | Munshi | F01D 25/305 415/116 |
| 2017/0306792 | A1 * | 10/2017 | Fryer | F02C 7/32 |
| 2017/0342861 | A1 | 11/2017 | Hatano | |
| 2018/0030856 | A1 * | 2/2018 | Kloetzer | B21D 22/20 |
| 2018/0202318 | A1 * | 7/2018 | Fryer | F02C 7/232 |
| 2020/0200044 | A1 * | 6/2020 | Nishioka | F01D 25/243 |
| 2022/0099108 | A1 * | 3/2022 | Bourolleau | F04D 29/522 |

* cited by examiner

CASING AND AXIAL FLOW ROTATING MACHINE

CROSS-REFERENCE TO RELATED APPLICATION

Priority is claimed on Japanese Patent Application No. 2022-010984, filed Jan. 27, 2022, the content of which is incorporated herein by reference.

BACKGROUND OF THE INVENTION

Field of the Invention

The present disclosure relates to a casing and an axial flow rotating machine.

Description of Related Art

Japanese Unexamined Patent Application, First Publication No. 2016-113992 discloses a pressure vessel including a thickness increased portion that has an increased thickness in a radial direction, which is formed in a portion in a circumferential direction, in order to suppress deformation of a casing and improve roundness.

Japanese Unexamined Patent Application, First Publication No. 2020-101145 discloses a gas turbine including an upper half casing that forms an upper half of a casing wall, a lower half casing that forms a lower half of the casing wall, and a plurality of fastening bolts configured to fasten the upper half casing and the lower half casing.

SUMMARY OF THE INVENTION

Incidentally, for an axial flow rotating machine, it is required to enlarge an exhaust gas flow channel for further performance improvement. Meanwhile, when the exhaust gas flow channel is enlarged, external dimensions of the casing are increased, and as a result, transportability of the casing may be lowered.

In order to solve the above-mentioned problems, the present disclosure is directed to providing a casing and an axial flow rotating machine capable of suppressing enlargement of an external dimension thereof while achieving an increase in size of an exhaust gas flow channel, In order to solve the problems, a casing of the present disclosure includes a casing main body and a connecting flange. The casing main body covers an outer circumferential side of a rotor that rotates around an axis. The connecting flange extends from an outer circumferential portion of the casing main body toward the outer circumferential side, is provided along a circumferential direction around the axis, and is connected to a member other than the connecting flange in an axial direction that is an extension direction of the axis. The connecting flange is cut out in an upper end portion or a horizontal end portion of the connecting flange.

In order to solve the above-mentioned problems, an axial flow rotating machine of the present disclosure includes a casing and a rotor. The rotor rotates around an axis. The casing includes a casing main body and a connecting flange. The casing main body covers an outer circumferential side of the rotor. The connecting flange extends from an outer circumferential portion of the casing main body toward the outer circumferential side, is provided along a circumferential direction around the axis and is connected to a member other than the connecting flange in an axial direction that is an extension direction of the axis. The connecting flange is cut out in an upper end portion or a horizontal end portion of the connecting flange.

According to the casing and the axial flow rotating machine of the present disclosure, it is possible to provide a casing and an axial flow rotating machine capable of suppressing enlargement of an external dimension thereof while achieving an increase in size of an exhaust gas flow channel.

DETAILED DESCRIPTION OF THE INVENTION

Hereinafter, a casing and an axial flow rotating machine according to an embodiment of the present disclosure are described with reference to the accompanying drawings. In the following description, components having the same or similar functions are designated by the same reference signs. Then, overlapping description of the components may be omitted. In this application, "XX or YY" is not limited to the case of any one of XX and YY and may include cases of both of XX and YY. This is also similar to the case when there are three or more optional elements. XX and YY are arbitrary elements.

In the following description, an extension direction of an axis Ar is defined as an axial direction Da, a circumferential direction around the axis Ar is defined as a circumferential direction Dc, and a direction perpendicular to the axis Ar is defined as a radial direction Dr. In the axial direction Da, a side of a compressor 20 with reference to a turbine 40 described below is defined as an axial direction upstream side Dau, and a side opposite thereto with reference to the turbine 40 is defined as an axial direction downstream side Dad. In the radial direction Dr, a side close to the axis Ar is defined as a radial direction inner side Dri, and a side opposite thereto is defined as a radial direction outer side Dro.

EMBODIMENT (Configuration of Gas Turbine)

Figure 1:
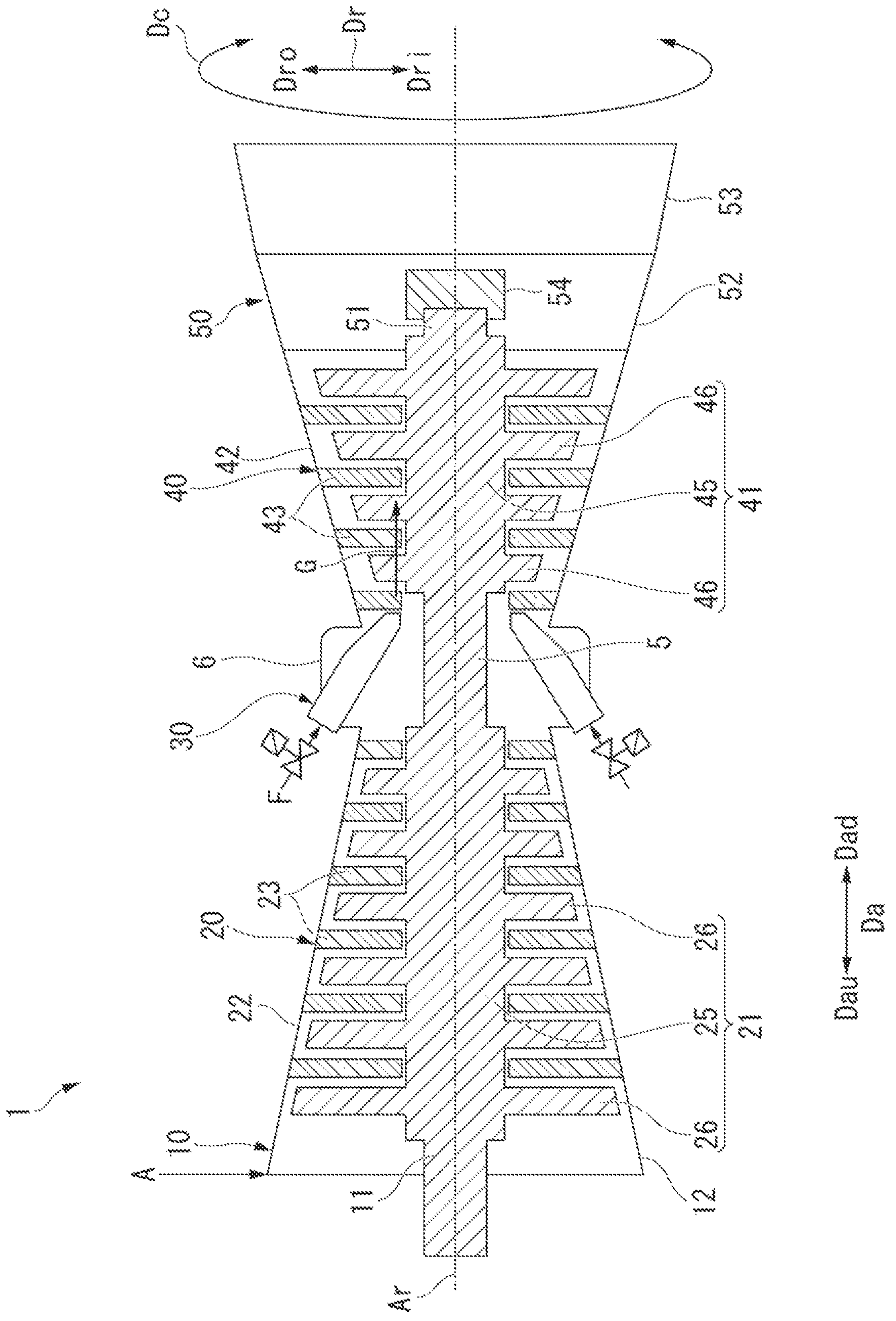
FIG. 1 is a cross-sectional view schematically showing a gas turbine according to an embodiment of the present disclosure as a whole.

FIG. 1 is a cross-sectional view schematically showing a gas turbine 1 of an embodiment as a whole. The gas turbine 1 is an example of "an axial flow rotating machine" or "a rotating machine for power generation". The gas turbine 1 includes an intake part 10 configured to suction air A from the outside, the compressor 20 configured to compress the air A suctioned from the intake part 10, a combustor 30 configured to combust fuel F in the air A compressed by the compressor 20 and generate a combustion gas G, a turbine 40 driven by the combustion gas C, and an exhaust part 50 configured to guide the combustion gas C passing through the turbine 40 to the outside.

The intake part. 10 includes a rotary shaft 11, and an intake casing 12 configured to cover an outer circumferential side of the rotary shaft 11. One end portion of the rotary shaft 11 is connected to a power generator (not shown in the drawings).

The compressor 20 includes a compressor rotor 21 that rotates around the axis Ar, a compressor casing 22 configured to cover an outer circumferential side of the compressor rotor 21, and a plurality of compressor vane stages 23 provided at an inner circumferential side of the compressor casing 22. The compressor rotor 21 includes a rotor shaft 25, and a plurality of compressor blade stages 26 attached to the rotor shaft 25.

The turbine 40 includes a turbine rotor 41 that rotates around the axis Ar, a turbine casing 42 configured to cover an outer circumferential side of the turbine rotor 41, and a plurality of turbine vane stages 43 provided on an inner circumferential side of the turbine casing 42. The turbine rotor 41 includes a rotor shaft 45, and a plurality of turbine blade stages 46 attached to the rotor shaft 45.

The exhaust part 50 includes a rotary shaft 51, an exhaust casing 52 configured to cover an outer circumferential side of the rotary shaft 51, an exhaust chamber 53 disposed on the axial direction downstream side Dad of the exhaust casing 52, and a bearing part 54 configured to support the rotary shaft 51. The rotary shaft 51 is an example of "a rotor."

The rotary shaft 11, the compressor rotor 21, the turbine rotor 41, and the rotary shaft 51 are located on the same axis Ar and connected to each other. Accordingly, a gas turbine rotor 5 including the rotary shaft 11, the compressor rotor 21, the turbine rotor 41, and the rotary shaft 51 is provided. Meanwhile, the intake casing 12, the compressor casing 22, the turbine casing 42, the exhaust casing 52, and the exhaust chamber 53 are arranged in the axial direction Da and connected to each other. Accordingly, a gas turbine casing 6 including the intake casing 12, the compressor casing 22, the turbine casing 42, the exhaust casing 52, and the exhaust chamber 53 is provided.

(Gas Turbine Casing)

Figure 2:
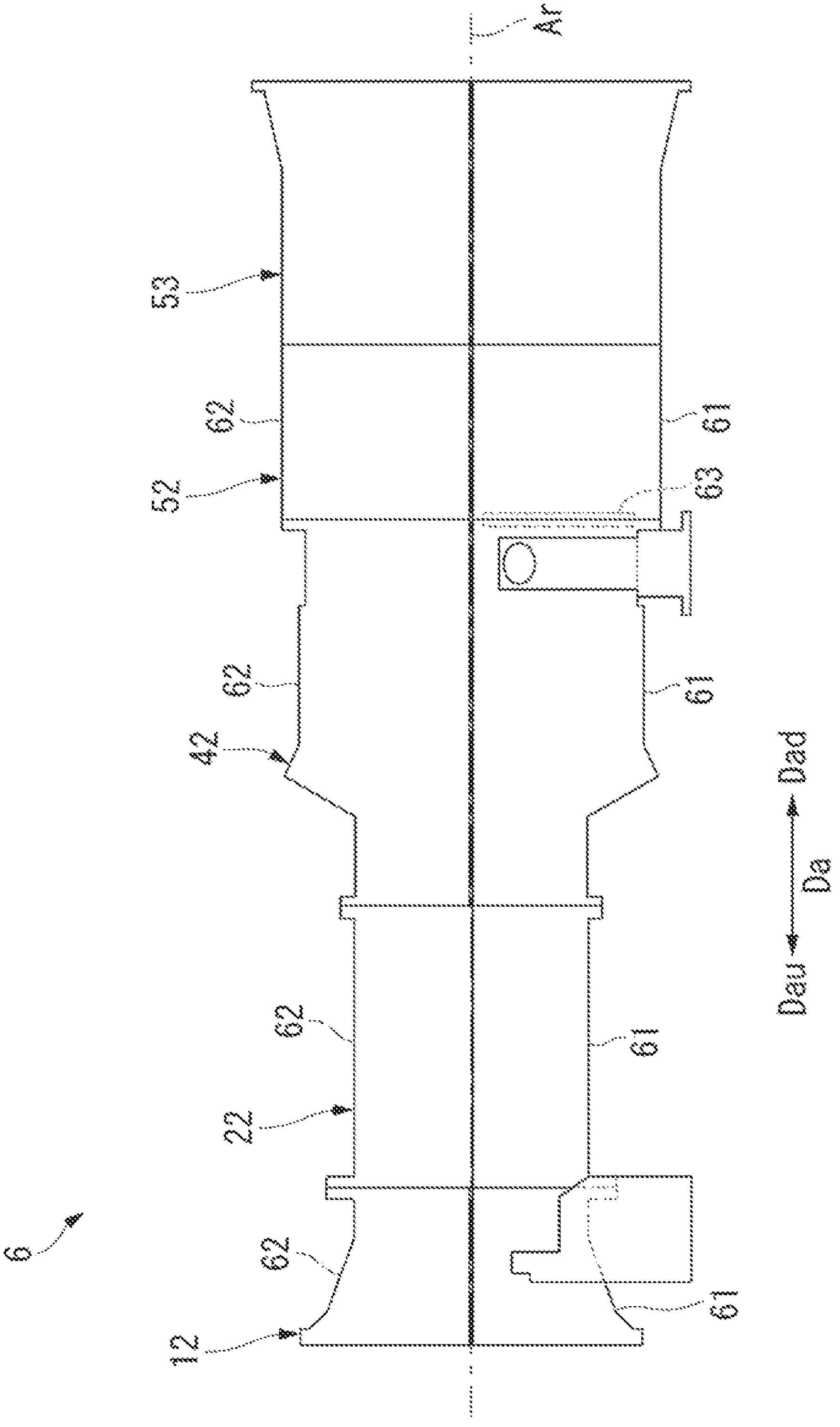
FIG. 2 is a side view showing a gas turbine casing according to the embodiment of the present disclosure.

FIG. 2 is a side view showing the gas turbine casing 6. For example, each of the intake casing 12, the compressor casing 22, the turbine casing 42, and the exhaust casing 52 (hereinafter, these are generally referred to as "a casing") is formed in an annular shape around the axis Ar and vertically divided into two portions. Accordingly, each of these casings includes a lower half casing 61 including a lower half of that casing, and an upper half casing 62 including an upper half of that casing. Each of the lower half casing 61 and the upper half casing 62 is a semi-annular shape. The lower half casing 61 is an example of "a first casing member". The upper half casing 62 is an example of "a second casing member".

In the embodiment, a spigot-joint structure 63 is provided on a connecting portion between the lower half casing 61 of the turbine casing 42 and the lower half casing 61 of the exhaust casing 52. The spigot-joint structure 63 is a step structure configured to align the two lower half casings 61 aligned (adjacent) in the axial direction Da. For example, the spigot-joint structure 63 includes a recessed portion provided on one of the two lower half casings 61 aligned in the axial direction Da, and a protruding portion provided on the other of the two lower half casings 61 and fitted into the recessed portion.

(Exhaust Casing)

Next, the exhaust casing 52 are described. In the embodiment, longitudinal flanges 81 and 82 of the exhaust casing 52 are cut out at specified areas, and thus, an increase in external dimension of the exhaust casing 52 is suppressed, Hereinafter, details thereof are described in detail.

Figure 3:
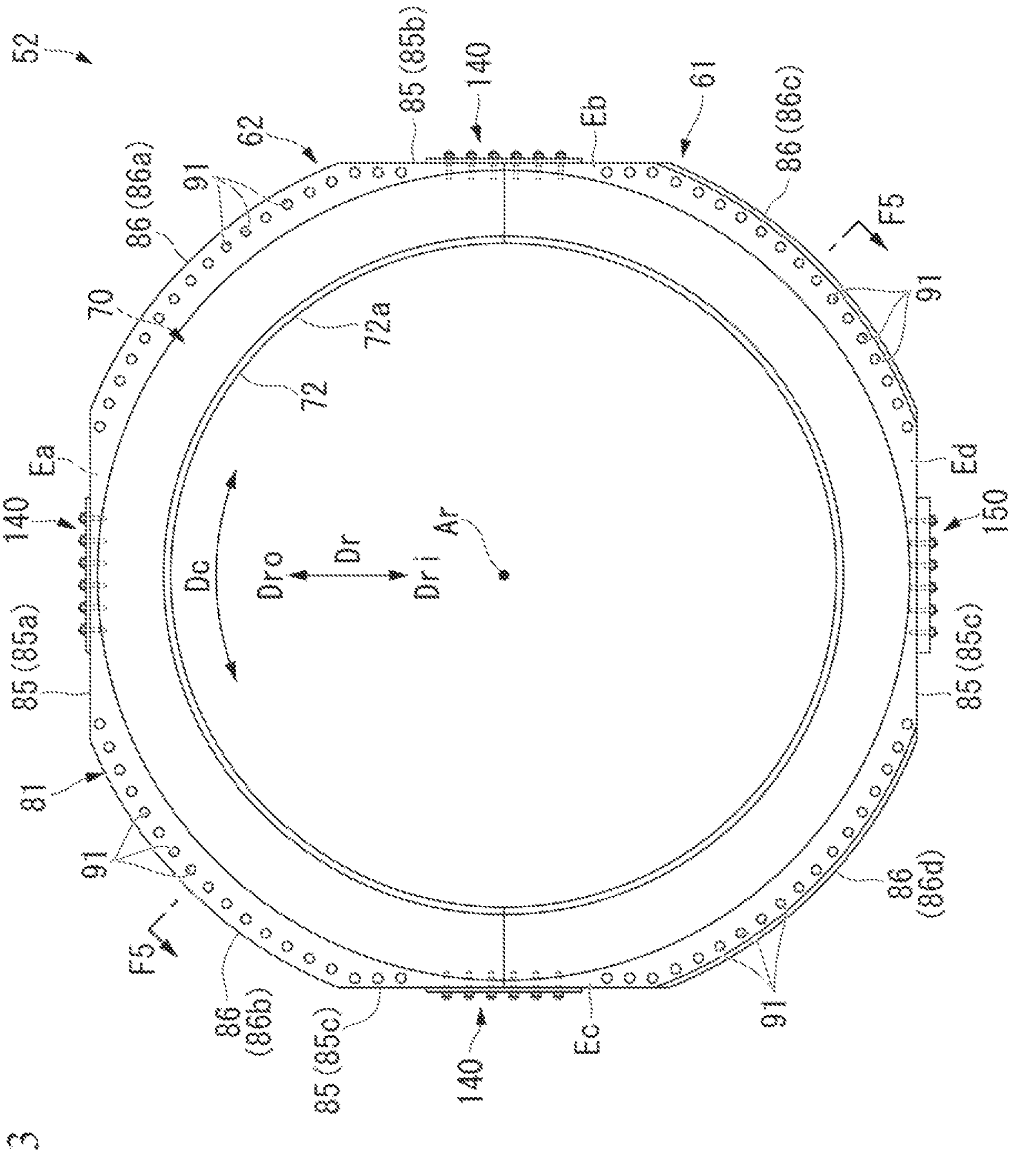
FIG. 3 is a front view showing an exhaust casing according to the embodiment of the present disclosure.

FIG. 3 is a front view showing the exhaust casing 52. The exhaust casing 52 includes, for example, a casing main body 70, the longitudinal flange 81, and the longitudinal flange 82 (see FIG. 5).

(Casing Main Body)

The casing main body 70 is formed in an annular shape around the axis Ar and extends in the axial direction Da. The casing main body 70 constitutes a major part of the exhaust casing 52 and covers the rotary shaft 51 (see FIG. 1) from an outer circumferential side. The casing main body 70 includes an annular outer wall section (outer tube section) 71, and a diffuser section (inner tube section) 72 disposed on the radial direction inner side Dri of the outer wall section 71 and forming an exhaust gas flow channel **72*a*. The diffuser section 72 has, for example, an inner diameter enlarged as it extends toward the axial direction downstream side Dad (see FIG. 5). The bearing part 54, a strut configured to support the bearing part 54 (see FIG. 1), and the like are disposed on the radial direction inner side Dri of the casing main body 70. Further, in the drawings subsequent to FIG. 3, illustration of parts disposed on the radial direction inner side Dri of the casing main body 70** are omitted.

(Longitudinal Flange)

The longitudinal flange 81 is provided on an end portion of the casing main body 70 on the axial direction upstream side Dau (i.e., an end portion adjacent to the turbine casing 42). The longitudinal flange 81 is connected to the turbine casing 42 in the axial direction Da. The longitudinal flange 81 is an example of "a connecting flange", The turbine casing 42 is an example of "another member".

Meanwhile, the longitudinal flange 82 (see FIG. 5) is provided on an end portion of the casing main body 70 on the axial direction downstream side Dad (i.e., an end portion adjacent to the exhaust chamber 53). The longitudinal flange 82 is connected to an exhaust chamber member 55 in the axial direction Da. The exhaust chamber member 55 is a member that forms the exhaust chamber 53. The longitudinal flange 82 is another example of "a connecting flange." The exhaust chamber member 55 is another example of "another member."

Configurations and functions of the above-mentioned two longitudinal flanges 81 and 82 are substantially the same as each other. For this reason, hereinafter, the longitudinal flange 81 is described in detail. In details of the other longitudinal flange 82, in the following description of the longitudinal flange 81, "the longitudinal flange 81" may be read as "the longitudinal flange 82", "the axial direction upstream side Dau" may be read as "the axial direction downstream side Dad" and "the turbine casing 42" may be read as "the exhaust chamber member 55".

The longitudinal flange 81 stands against an outer circumferential portion of the casing main body 70 (for example, the outer wall section 71 of the casing main body 70), and extends from the casing main body 70 toward the radial direction outer side Dro. The longitudinal flange 81 is provided along the circumferential direction De. The longitudinal flange 81 includes a plate shape along the radial direction Dr and the circumferential direction De. The longitudinal flange 81 is formed in, for example, an annular shape along an outer circumferential portion of the casing main body 70 except four planar sections 85 described below.

(Planar Sections of Longitudinal Flange)

Next, the four planar sections 85 provided on the longitudinal flange 81 are described.

Figure 4:
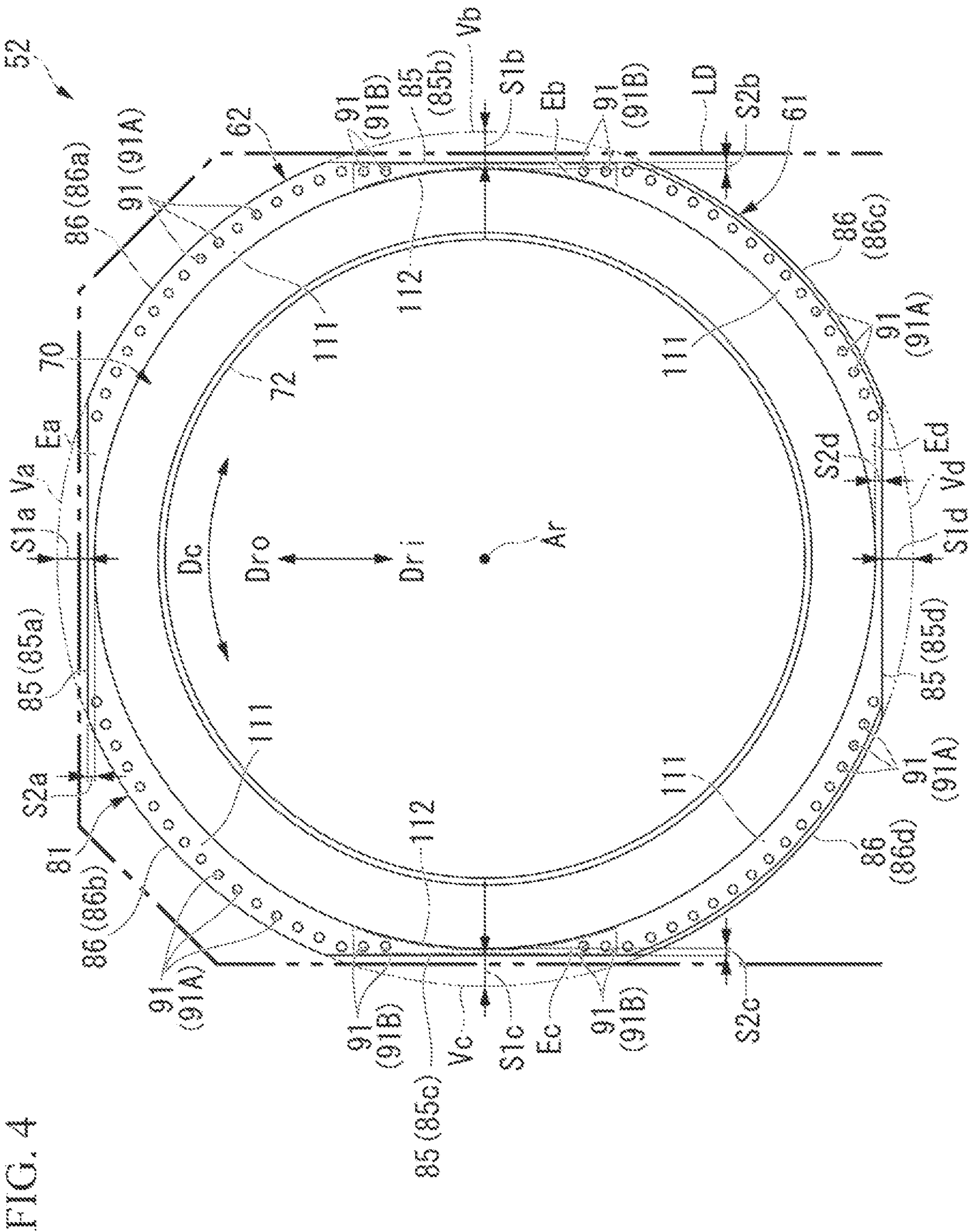
FIG. 4 is a view for describing a planar section of the exhaust casing according to the embodiment of the present disclosure.

FIG. 4 is a view for describing the four planar sections 85 provided on the longitudinal flange 81. In the embodiment, the longitudinal flange 81 includes the four planar sections 85 (an upper planar section 85*a*, a first side planar section 85*b*, a second side planar section 85*e*, and a lower planar section 85*d*), and four are portions 86 (a first arc portion 86*a*, a second arc portion 86*b*, a third arc portion 86*c*, and a fourth are portion 86*d*) provided between the four planar sections 85.

The upper planar section 85*a* is provided on an upper end portion Ba of the longitudinal flange 81. That is, the upper planar section 85*a* is provided by cutting out the longitudinal flange 81 in the upper end portion Ea of the longitudinal flange 81. "Cutting out the longitudinal flange 81 in the upper end portion Ea" means that, assuming a longitudinal flange with a virtual circular outline, a region where an outline of the longitudinal flange 81 is located on the radial direction inner side Dri with respect to the virtual circular outline is present in the upper end portion Ea. This definition is also the same in horizontal end portions Eb and Ec and a lower end portion Ed. For example, the upper planar section 85*a* is provided as a planar section along the horizontal direction by linearly cutting out the longitudinal flange 81 in the horizontal direction. The upper planar section 85*a* defines a part of the outline of the longitudinal flange 81 (the outline of the exhaust casing 52). The upper planar section 85*a* is an example of "a first planar section".

The upper planar section 85*a* is provided between the first are portion 86*a* and the second are portion 86*b*. When a virtual line Va with the same curvature as the first arc portion 86*a* is defined between the first arc portion 86*a* and the second are portion 86*b*, the upper planar section 85*a* is located on the radial direction inner side Dri of the virtual line Va. By providing the upper planar section 85*a*, a height of the exhaust casing 52 in the vertical direction is reduced by a length S1*a* (hereinafter, referred to as "a reduction length S1*a*"). The reduction length S1*a* is a maximum distance in the vertical direction between the upper planar section 85*a* and the virtual line Va. For example, the reduction length S1*a* is greater than a length S2*a* in the vertical direction (i.e., a minimum length of the longitudinal flange 81 in the vertical direction) between a central portion of the upper planar section 85*a* and the casing main body 70.

The first side planar section 85*b* is provided on the first horizontal end portion Eb (first side end portion) of the longitudinal flange 81. That is, the first side planar section 85*b* is provided by cutting out the longitudinal flange 81 in the first horizontal end portion Eb of the longitudinal flange 81. In the application. "the horizontal end portion" means an end portion in the horizontal direction perpendicular to the axial direction Da. For example, the first side planar section 85*b* is provided as a planar section along the vertical direction by linearly cutting out the longitudinal flange 81 in the vertical direction. The first side planar section 85*b* defines a part of an outline of the longitudinal flange 81 (an outline of the exhaust casing 52). The first side planar section 85*b* is an example of "a second planar section".

The first side planar section 85*b* is provided between the first are portion 86*a* and the third are portion 86*c*. When a virtual line Vb with the same curvature as the first are portion 86*a* is defined between the first are portion 86*a* and the third are portion 86*c*, the first side planar section 85*b* is located on the radial direction inner side Dri of the virtual line Vb. By providing the first side planar section 85*b*, a width of the exhaust casing 52 in the horizontal direction is reduced by a length S1*b* (hereinafter, referred to as "a reduction length Sib"). The reduction length S1*b* is a maximum distance in the horizontal direction between the first side planar section 85*b* and the virtual line Vb. For example, the reduction length Sib is greater than a length S2*b* in the horizontal direction between a central portion of the first side planar section 85*b* and the casing main body 70 (i.e., a minimum length of the longitudinal flange 81 in the horizontal direction).

The second side planar section 85*c* is provided on the second horizontal end portion Ec (second side end portion) of the longitudinal flange 81. That is, the second side planar section 85*c* is provided by cutting out the longitudinal flange 81 in the second horizontal end portion Ec of the longitudinal flange 81. The second horizontal end portion Ec is an end portion located on a side of the casing main body 70 opposite to the first horizontal end portion Eb. For example, the second side planar section 85*c* is provided on a planar section along the vertical direction by linearly cutting out the longitudinal flange 81 in the vertical direction. The second side planar section 85*c* defines a part of the outline of the longitudinal flange 81 (the outline of the exhaust casing 52).

The second side planar section 85*e* is provided between the second are portion 86*b* and the fourth are portion 86*d*. When a virtual line Vc with the same curvature as the second are portion 86*b* is defined between the second are portion 86*b* and the fourth are portion 86*d*, the second side planar section 85*e* is located on the radial direction inner side Dri of the virtual line Vc. By providing the second side planar section 85*c*, a width of the exhaust casing 52 in the horizontal direction is reduced by a length S1*c* (hereinafter, referred to as "a reduction length S1*c*"). The reduction length S1*c* is a maximum distance in the horizontal direction between the second side planar section 85*c* and the virtual line Vc. For example, the reduction length Sic is greater than a length Se in the horizontal direction between a central portion of the second side planar section 85*c* and the casing main body 70 (i.e., a minimum length of the longitudinal flange 81 in the horizontal direction).

The lower planar section 85*d* is provided on the lower end portion Ed of the longitudinal flange 81. That is, the lower planar section 85*d* is provided by cutting out the longitudinal flange 81 in the lower end portion Ed of the longitudinal flange 81. For example, the lower planar section 85*d* is provided as the planar section along the horizontal direction by linearly cutting out the longitudinal flange 81 in the horizontal direction. The lower planar section 85*d* defines a part of the outline of the longitudinal flange 81 (the outline of the exhaust casing 52).

The lower planar section 85*d* is provided between the third are portion 86*c* and the fourth arc portion 86*d*. When a virtual line Vd with the same curvature as the third arc portion 86*c* is defined between the third are portion 86*c* and the fourth are portion 86*d*, the lower planar section 85*d* is located on the radial direction inner side Dri than the virtual line Vd. By providing the lower planar section 85*d*, a height of the exhaust casing 52 in the vertical direction is reduced by a length Sid (hereinafter, referred to ax "a reduction length Sid"), The reduction length Sid is a maximum distance in the vertical direction between the lower planar section 85*d* and the virtual line Vd. For example, the reduction length Sid is greater than a length S2*d* in the vertical direction between a central portion of the upper planar section 85*a* and the casing main body 70 (i.e., a minimum length of the longitudinal flange 81 in the vertical direction).

Here, depending on the country or region, there may be restrictions on the external dimension that can be transported by a specific transportation means (for example, a railroad). The line indicated by a bold two-dot chain line in FIG. 4 shows an example of a maximum external dimension that can be transported by a railroad (hereinafter, referred to as "an external dimension LD of a transportation limit"). In the embodiment, the height of the exhaust casing 52 is within the external dimension LD of the transportation limit by cutting out the upper end portion Ba of the longitudinal flange 81. Similarly, a lateral width of the exhaust casing 52 is within the external dimension LD of the transportation limit by cutting out the first horizontal end portion Eb and the second horizontal end portion Ec of the longitudinal flange 81.

Each of the four arc portions 86 (the first are portion 86*a*, the second are portion 86*b*, the third arc portion 86*c*, and the fourth are portion 86*d*) defines a part of the outline of the longitudinal flange 81 (the outline of the exhaust casing 52). The first are portion 86*a* is provided between the upper planar section 85*a* and the first side planar section 85*b* and connects the upper planar section 85*a* and the first side planar section 85*b*. The second are portion 86*b* is provided between the upper planar section 85*a* and the second side planar section 85*c* and connects the upper planar section 85*a* and the second side planar section 85*c*. The third are portion 86*c* is provided between the first side planar section 85*b* and the lower planar section 85*d* and connects the first side planar section 85*b* and the lower planar section 85*d*. The fourth are portion 86*d* is provided between the second side planar section 85*c* and the lower planar section 85*d* and connects the second side planar section 85*c* and the lower planar section 85*d*. The four are portions 86 have the same curvature, (Bolt Holes of Longitudinal Flange)

Next, bolt holes 91 provided in the longitudinal flange 81 are described.

The plurality of bolt holes 91 are provided in the longitudinal flange 81, The bolt holes 91 are open in the axial direction Da. A bolt 92 is inserted into each of the bolt holes 91 in the axial direction Da. In this application, "the bolt hole" widely means a bore into which a bolt is inserted, and may be a hole with a screw thread with which the bolt is engaged or may be a hole with no screw thread.

Figure 5:
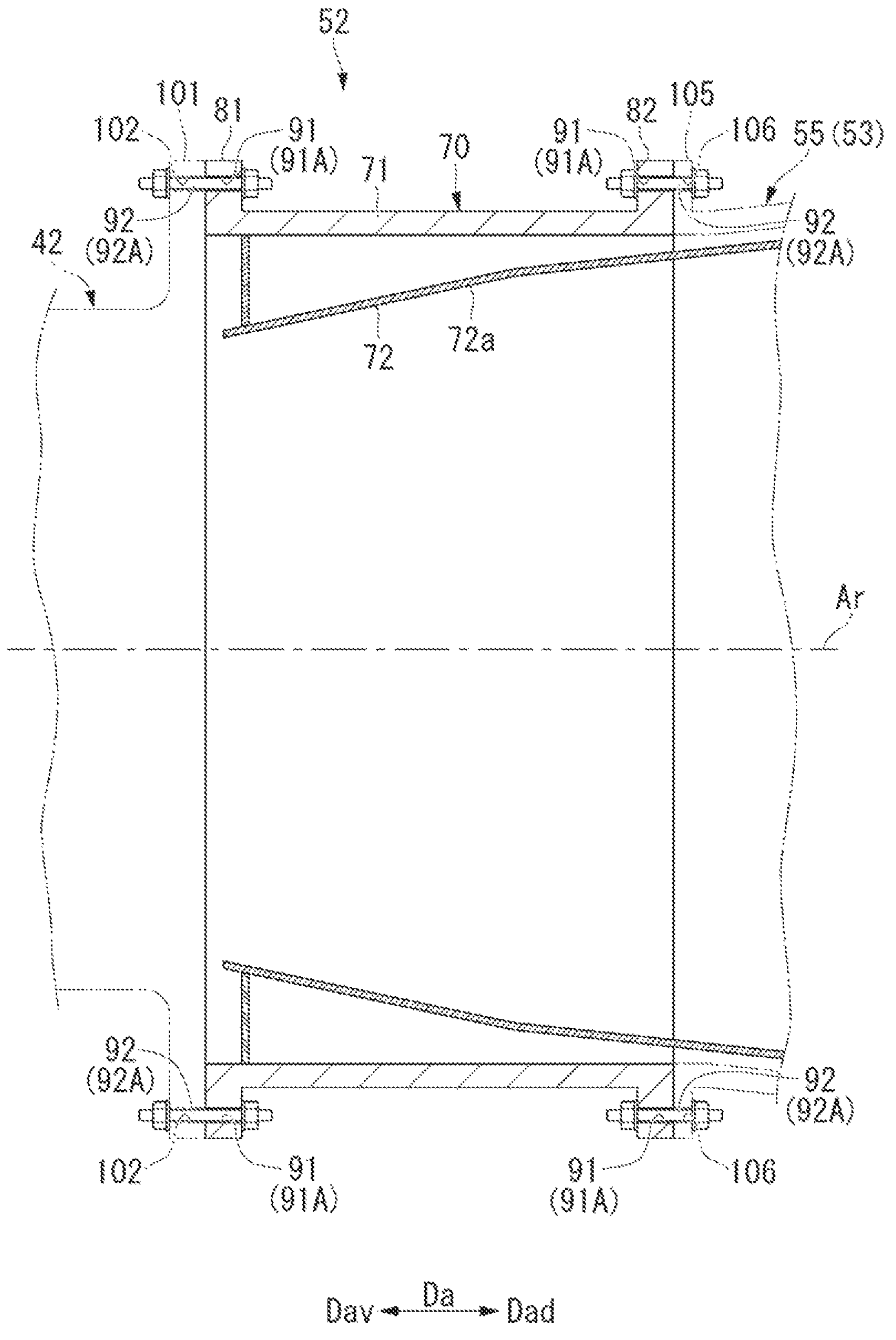
FIG. 5 is a cross-sectional view along line F5-F5 of the exhaust casing shown in FIG. 3.

FIG. 5 is a cross-sectional view along line F5-F5 of the exhaust casing 52 shown in FIG. 3. An end portion of the turbine casing 42 on the axial direction downstream side Dad includes a longitudinal flange 101 facing the longitudinal flange 81 of the exhaust casing 52. The longitudinal flange 101 of the turbine casing 42 includes a plurality of bolt holes 102. The plurality of bolt holes 91 of the longitudinal flange 81 of the exhaust casing S2 and the plurality of bolt boles 102 of the longitudinal flange 101 of the turbine casing 42 face each other in the axial direction Da. The longitudinal flange 81 of the exhaust casing 52 and the longitudinal flange 101 of the turbine casing 42 are coupled to each other by the bolts 92 passing through the bolt holes 91 of the longitudinal flange 81 of the exhaust casing 52 and the bolt holes 102 of the longitudinal flange 101 of the turbine caving 42.

Similarly, an end portion of the exhaust chamber member 55 on the axial direction upstream side Dau includes a longitudinal flange 105 facing the longitudinal flange 82 of the exhaust casing 52. The longitudinal flange 105 of the exhaust chamber member 55 includes a plurality of bolt holes 106, The plurality of bolt holes 91 of the longitudinal flange 82 of the exhaust casing 52 and the plurality of bolt holes 106 of the longitudinal flange 105 of the exhaust chamber member 55 face each other in the axial direction Da. The longitudinal flange 82 of the exhaust casing 52 and the longitudinal flange 105 of the exhaust chamber member 55 are coupled to each other by the bolts 92 passing through the bolt boles 91 of the longitudinal flange 82 of the exhaust casing 52 and the bolt holes 106 of the longitudinal flange 105 of the exhaust chamber member 55.

(Disposition of Bolt Holes of Longitudinal Flange)

Next, returning to FIG. 4, disposition of the bolt holes 91 provided in the longitudinal flange 81 is described. The plurality of bolt boles 91 includes a plurality of bolt holes 91A and a plurality of bolt holes 91B. The plurality of bolt holes 91A are disposed in the circumferential direction De along an outer circumferential portion of the longitudinal flange 81. The plurality of bolt boles 91A are divided into the four are portions 86 and disposed therein.

Meanwhile, the plurality of bolt boles 91B are disposed in the vertical direction along the first side planar section 85*b* or the second side planar section 85*c*. In the embodiment, the plurality of (for example, two) bolt holes 91B are arranged in the vertical direction along the first side planar section 85*b* in the lower half casing 61 of the exhaust casing 52. In addition, the other plurality of (for example, two) bolt boles 918 are arranged in the vertical direction along the first side planar section 85*b* in the upper half casing 62 of the exhaust casing 52.

Similarly, the plurality of (for example, two) bolt holes 91B are arranged in the vertical direction along the second side planar section 85*c* in the lower half casing 61 of the exhaust casing 52. In addition, the other plurality of (for example, two) bolt holes 91B are arranged in the vertical direction along the second side planar section 85*c* in the upper half casing 62 of the exhaust casing 52.

From another point of view, the longitudinal flange 81 includes a first portion 111 and a second portion 112. The first portion 111 is a region outside a first horizontal Mange 121 and a second horizontal flange 122 described below (see FIG. 8) (non-overlapping region) when seen in the axial direction Da. Meanwhile, the second portion 112 is a region overlapping the first horizontal flange 121 or the second horizontal flange 122 when seen in the axial direction Da. The plurality of bolt holes 91A are provided in the first portion 111 of the longitudinal flange 81. The plurality of bolt holes 918 are provided in the second portion 112 of the longitudinal flange 81. Double-nut bolts 92A (see FIG. 10) are inserted into the bolt boles 91A. Meanwhile, stud bolts 92B (see FIG. 10) are inserted into the bolt holes 91B. Details thereof are described below in detail.

Figure 6:
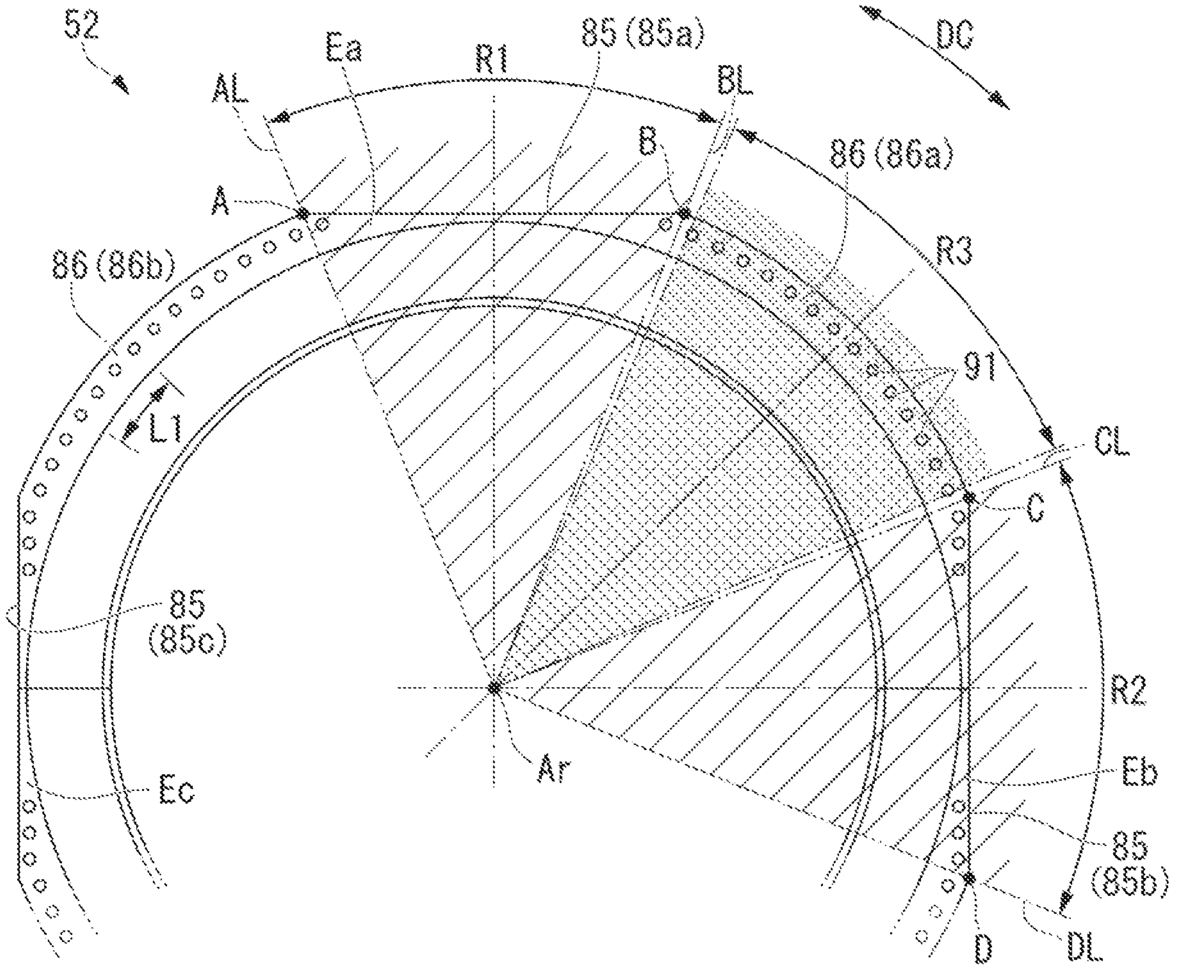
FIG. 6 is a view for describing disposition of bolt boles according to the embodiment of the present disclosure.

FIG. 6 is a view for describing disposition of the bolt holes 91 from a point of view. As shown in FIG. 6, the longitudinal flange 81 includes a region R1, a region R2, and a region R3. The region R1 is a region including the upper cod portion Ba in the circumferential direction De. For example, the region R1 is a region defined by a line AL connecting the axis Ar and one end portion A of the upper planar section 85*a* and a line BL connecting the axis Ar and the other end portion B of the upper planar section 85*a*. The region R2 is a region including the first horizontal end portion Eb in the circumferential direction De. For example, the region R2 is a region defined by a line CL connecting the axis Ar and one end portion C of the first side planar section 85*b* and a line DL connecting the axis Ar and the other end portion D of the first side planar section 85*b*. The region R3 is a region located between the region R1 and the region R2 in the circumferential direction De and outside the upper end portion Ea and the horizontal end portions Eb and Ec. Each of the region R1 and the region R2 is an example of "a first region". The region R3 is an example of "a second region".

In the embodiment, a disposition density of the bolt holes 91 in the region R1 is smaller than a disposition density of the bolt holes 91 in the region R3. In addition, a disposition density of the bolt holes 91 in the region R2 is smaller than a disposition density of the bolt holes 91 in the region R3. "The disposition density" is a value obtained by dividing the number of the bolt boles 91 disposed in each region by an angle range of each region. In other words, when the angle ranges of the regions are the same, the number of the bolt holes 91 disposed in the region R1 is smaller than the number of the bolt holes 91 disposed in the region R3. In addition, the angle ranges of the regions are the same, the number of the bolt holes 91 disposed in the region R2 is smaller than the number of the bolt holes 91 disposed in the region R3.

In the embodiment, in the plurality of bolt holes 91, an are portion 86 includes three or more (for example, four) bolt holes within an arbitrary first distance L1. In the upper end portion Ea, the bolt holes 91 do not exist over the first distance L1 or longer. In addition, in each of the first side planar section 85*b* and the second side planar section 85*c*, the bolt holes 91 are not provided over the first distance L1 or longer.

Figure 7:
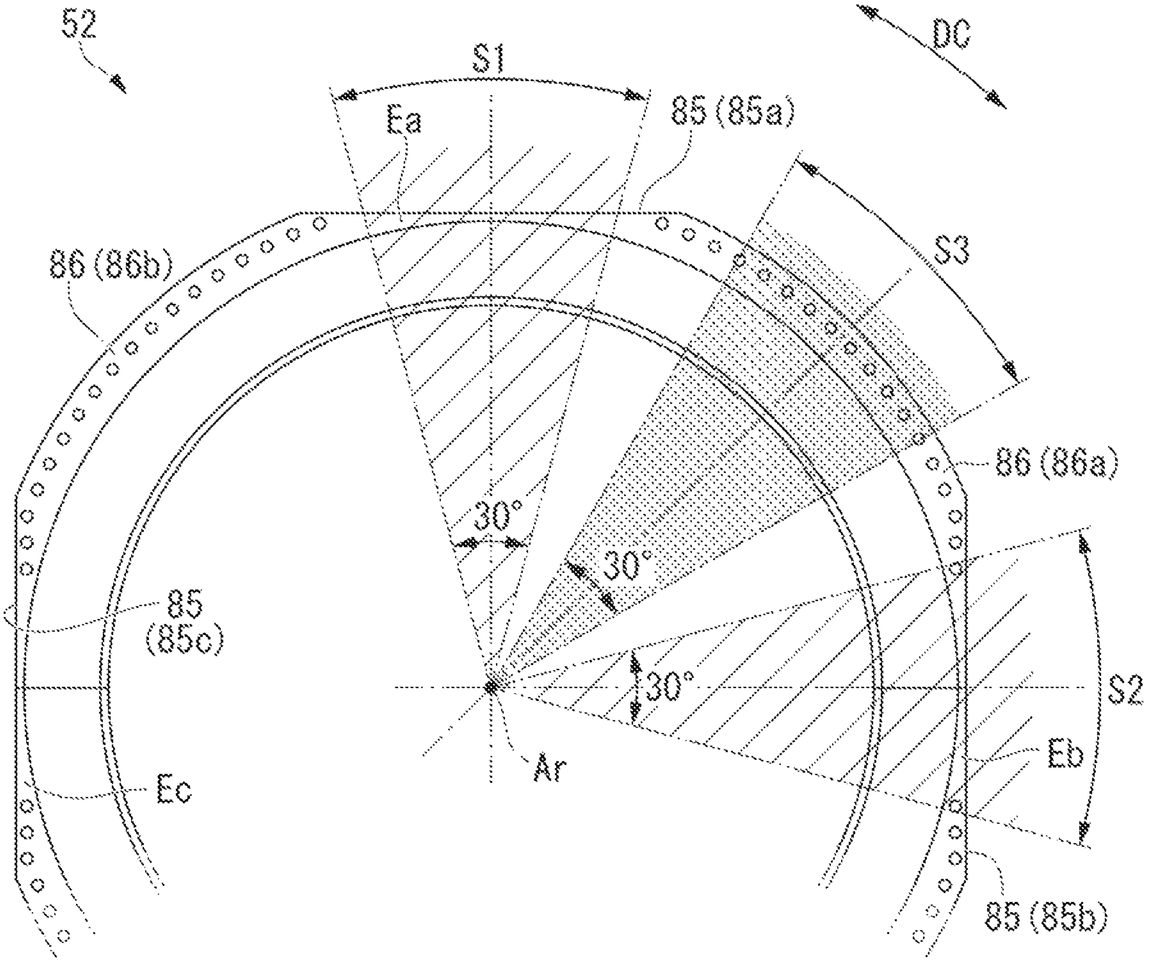
FIG. 7 is a view for describing disposition of the bolt holes according to the embodiment of the present disclosure.

FIG. 7 is a view for describing disposition of the bolt holes 91 from another point of view. As shown in FIG. 7, the longitudinal flange 81 includes a region S1, a region S2, and a region S3. The region S1 is a region having an angle range of 30 degrees with a center line thereof along the vertical direction and including at least a part of the upper end portion Ea in the circumferential direction De. The region S2 is a region having an angle range of 30 degrees with a center line thereof along the horizontal direction and including at least a part of the first horizontal end portion Eb in the circumferential direction De. The region S3 is a region having an angle range of 30 degrees with a center line thereof inclined at an angle of 45 degrees to the horizontal direction. Each of the region S1 and the region S2 is another example of "a first region". The region S3 is another example of "a second region".

That is, the region S1 is a region having angle ranges around the axis Ar of 15 degrees on one side and 15 degrees on the other side in the circumferential direction De of a center line thereof along the vertical direction, the region S2 is a region having angle ranges around the axis Ar of 15 degrees on one side and 15 degrees on the other side in the circumferential direction De of a center fine thereof along the vertical direction, and the region S3 is a region having angle ranges around the axis Ar of 15 degrees on one side and 15 degrees on the other side in the circumferential direction De of a center line thereof inclined at an angle of 45 degrees to the horizontal direction.

In the embodiment, a sum of cross-sectional areas of the bolt holes 91 in the region S1 is smaller than a sum of cross-sectional areas of the bolt holes 91 in the region S3. In addition, a sum of cross-sectional areas of the bolt holes 91 in the region S2 is smaller than a sum of cross-sectional areas of the bolt holes 91 in the region S3. "The sum of the cross-sectional areas of the bolt hole" is a sum of cross-sectional areas of the plurality of bolt holes 91 disposed in each region.

(Horizontal Flange)

Next, the first horizontal flange 121 and the second horizontal flange 122 are described.

Figure 8:
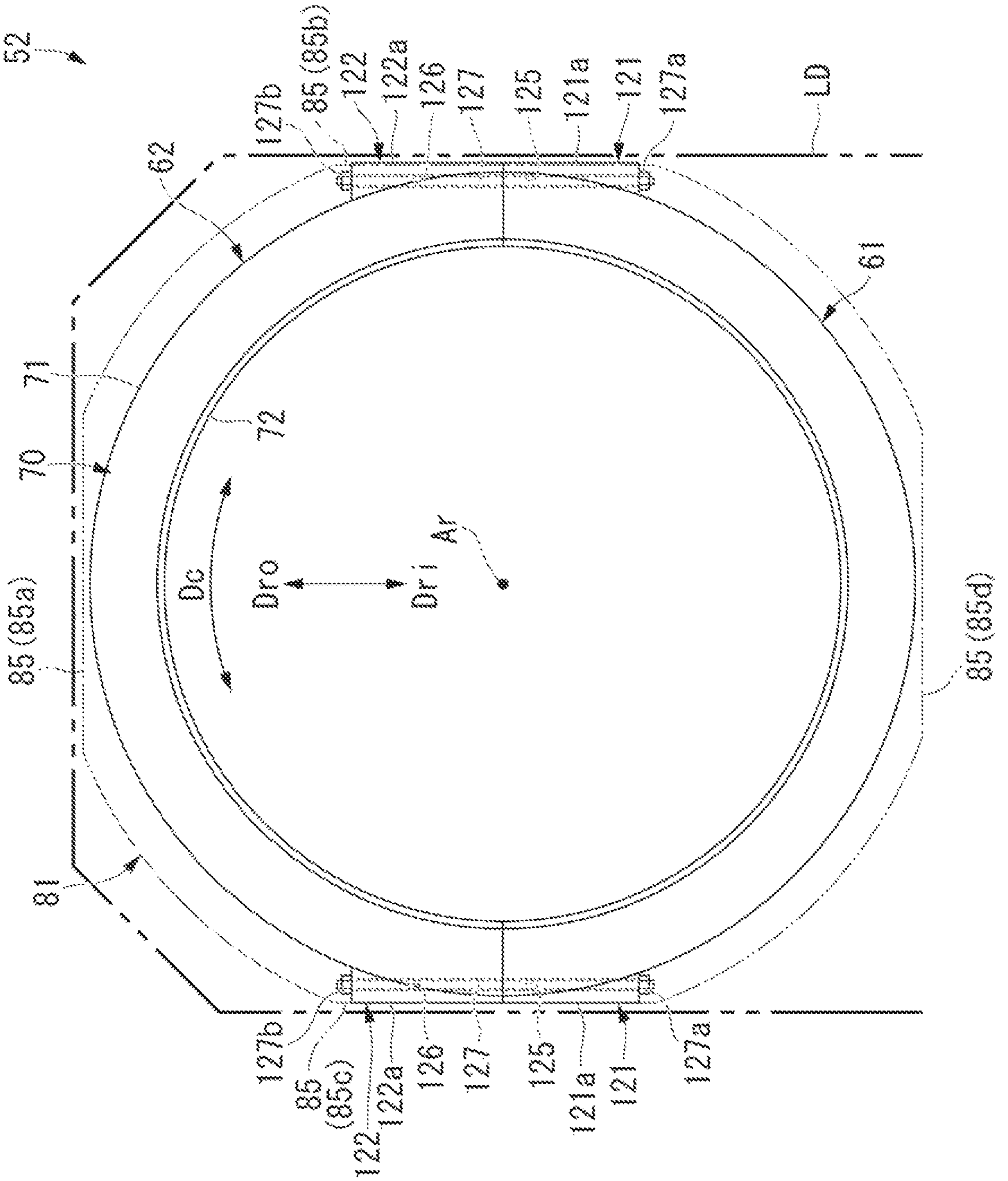
FIG. 8 is a view for describing a horizontal flange according to the embodiment, of the present disclosure.

FIG. 8 is a view for describing the first horizontal flange 121 and the second horizontal flange 122 and a view through the longitudinal flange 81.

The lower half casing 61 of the exhaust casing 52 includes the first horizontal flanges 121 extending in the horizontal direction from an outer circumferential portion of the casing main body 70. The first horizontal flange 121 is provided on each of one end portion (a first side end portion) of the lower half casing 61 in the circumferential direction De and the other end portion (a second side end portion) of the lower half casing 61 in the circumferential direction De. The first horizontal flange 121 is an example of "a side flange of a first casing member".

The first horizontal flange 121 is provided between the casing main body 70 and the above-mentioned external dimension LD of the transportation limit in the horizontal direction. The first horizontal flange 121 has a relatively large length vertically just below a boundary between the lower half casing 61 and the upper half casing 62 in order to secure a region where a not 127*a* (to be described) is disposed between the casing main body 70 and the external dimension LD of the transportation limit.

The first horizontal flange 121 includes a plurality of bolt holes 125. The plurality of bolt holes 125 are arranged parallel to the axial direction Da (see FIG. 9). Each of the bolt holes 125 passes through the first horizontal flange 121 in the vertical direction.

The first horizontal flange 121 includes a first flange side planar section 121*a*. The first flange side planar section 121*a* is an end surface facing a direction perpendicular to the axial direction Da. The first flange side planar section 121*a* is provided along the external dimension LD of the transportation limit. The first flange side planar section 121*a* is a planar section in the vertical direction. The first flange side planar section 121*a* is an example of "a third planar section".

Meanwhile, the upper half casing 62 of the exhaust casing 52 includes the second horizontal flanges 122 extending in the horizontal direction from an outer circumferential portion of the casing main body 70. The second horizontal flange 122 is provided on each of one end portion (a first side end portion) of the upper half casing 62 in the circumferential direction De and the other end portion (a second side end portion) of the upper half casing 62 in the circumferential direction De. The second horizontal flange 122 faces the first horizontal flange 121 in the vertical direction. The second horizontal flange 122 is an example of "a side flange of a second casing member".

The second horizontal flange 122 is provided between the casing main body 70 and the above-mentioned external dimension LD of the transportation limit in the horizontal direction. The second horizontal flange 122 has a relatively large length vertically just above a boundary between the lower half casing 61 and the upper half casing 62 in order to secure a region where a nut 127*b* (to be described below) is disposed between the casing main body 70 and the external dimension LD of the transportation limit.

The second horizontal flange 122 includes a plurality of bolt holes 126. The plurality of bolt holes 126 are arranged parallel to the axial direction Da (see FIG. 9). Each of the bolt holes 126 passes through the second horizontal flange 122 in the vertical direction. The plurality of bolt holes 125 of the first horizontal flange 121 and the plurality of bolt boles 126 of the second horizontal flange 122 face each other in the vertical direction. The first horizontal flange 121 and the second horizontal flange 122 are coupled to each other by bolts 127 passing through the bolt boles 125 of the first horizontal flange 121 and the bolt holes 126 of the second horizontal flange 122. The bolts 127 are, for example, double-nut bolts including the nuts 127*a* and 127*b*.

The second horizontal flange 122 includes a second flange side planar section 122*a*. The second flange side planar section 122*a* is an end surface facing a direction perpendicular to the axial direction Da. The second flange side planar section 122*a* is provided along the external dimension LD of the transportation limit. The second flange side planar section 122*a* is a planar section along a vertical direction. The second flange side planar section 122*a* is located on the same surface as the first flange side planar section 121*a*. The second flange side planar section 122*a* is an example of "a fourth planar section".

Figure 9:
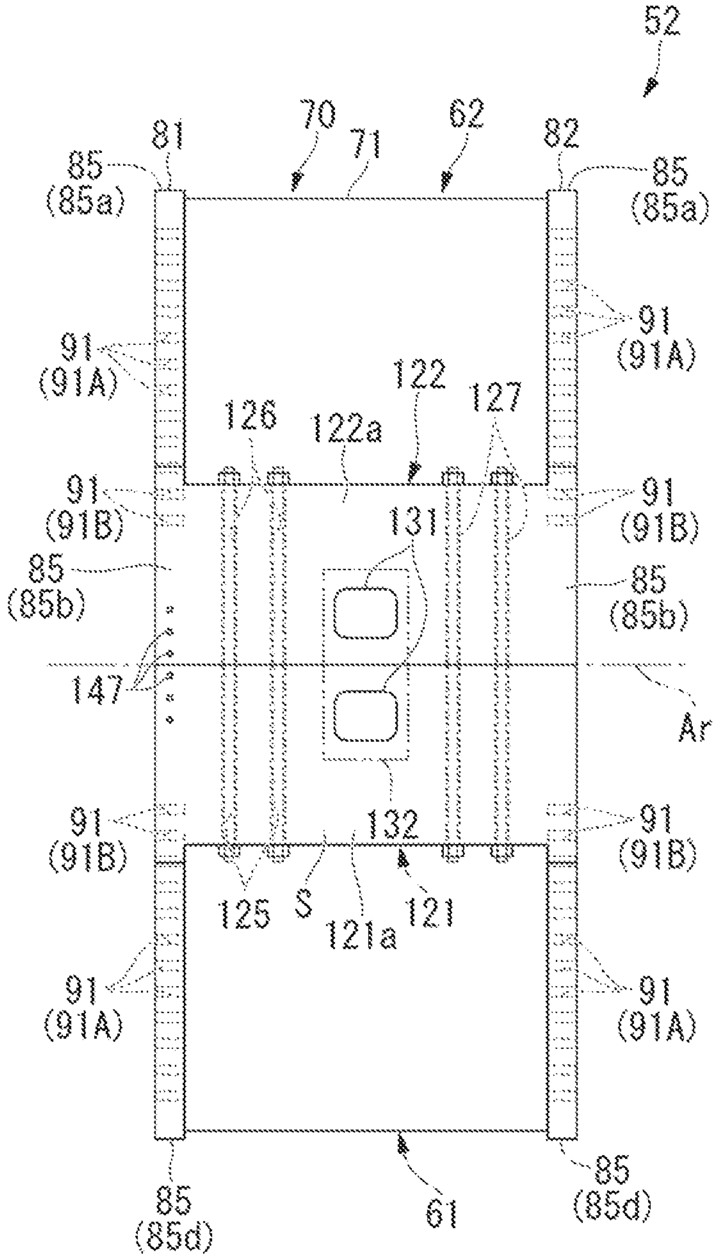
FIG. 9 is a side view of the exhaust casing according to the embodiment of the present disclosure.

FIG. 9 is a side view showing the exhaust casing 52. In the embodiment, the first side planar section 85*b* of the longitudinal flange 81 connects the first flange side planar section 121*a* and the second flange side planar section 122*a* in the axial direction Da. For example, the first side planar section 85*b* of the longitudinal flange 81, the first flange side planar section 121*a*, and the second flange side planar section 122*a* are located on the same plane.

Similarly, the first side planar section 85*b* of the longitudinal flange 82 connects the first flange side planar section 121*a* and the second flange side planar section 122*a* in the axial direction Da. For example, the first side planar section 85*b* of the longitudinal flange 82, the first flange side planar section 121*a*, and the second flange side planar section 122*a* are located on the same plane.

Accordingly, a large planar section S including the first side planar section 85*b* of the longitudinal flange 81, the first flange side planar section 121*a*, the second flange side planar section 122*a*, and the first side planar section 85*b* of the longitudinal flange 82 is formed. Further, the same applies to the second side planar section 85*c* of the longitudinal flange 81 and the second side planar section 85*c* of the longitudinal flange 82.

(Types of Bolts)

Figure 10:
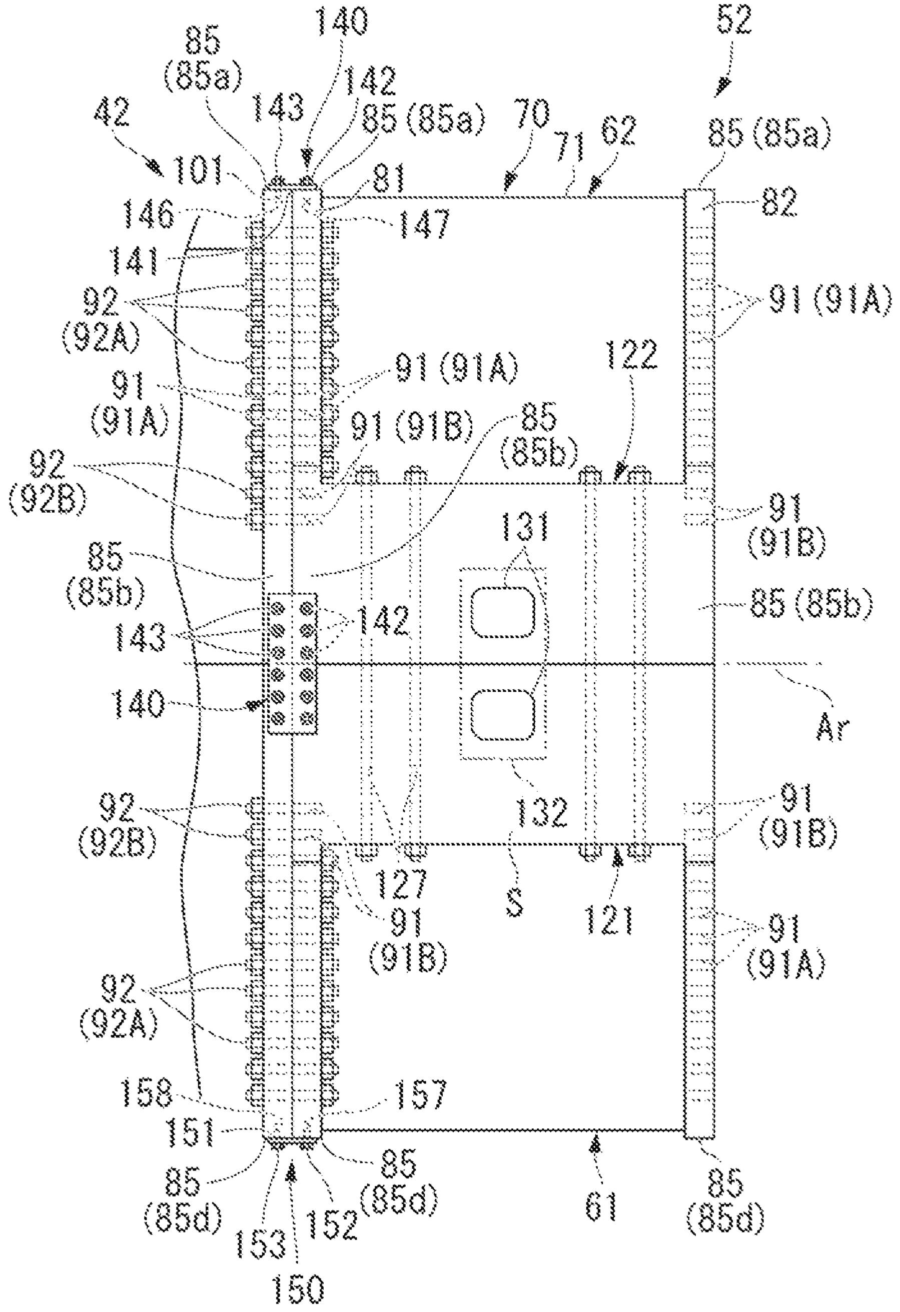
FIG. 10 is a side view showing a state in which the exhaust casing and the turbine casing according to the embodiment of the present disclosure are connected.

FIG. 10 is a side view showing a state in which the exhaust casing 52 and the turbine casing 42 are connected. The plurality of bolt holes 91A (the bolt holes 91 provided on the arc portion 86 of the longitudinal flange 81) are through-holes passing through the longitudinal flange 81 in the axial direction Da. Double-not bolts 92A pass through the bolt holes 91A as the bolts 92.

Meanwhile, the bolt holes 91B (the bolt holes 91 arranged along the first side planar section 85*b* or the second side planar section 85*c*) extends toward the first horizontal flange 121 or the second horizontal flange 122. Tip portions of the bolt holes 91B may reach a region in the first horizontal flange 121 or the second horizontal flange 122. The bolt holes 91B are bottomed holes having inner circumferential surfaces on which screw threads are formed. The stud bolts 92B are inserted into the bolt holes 918 as the bolts 92.

(Opening Portion of Flange Side Planar Section)

Each of the first flange side planar section 121*a* and the second flange side planar section 122*a* includes an opening portion 131. The opening portion 131 is in communication with the inside of the exhaust casing 52. The opening portion 131 is, for example, an opening portion for an operation configured to allow access to the inside of the exhaust casing 52. For example, an operator performs an operation (bolt fastening or the like of the diffuser section 72) in the exhaust casing 52 through the opening portion 131. The opening portion 131 is closed by a lid 132.

However, the opening portion 131 may be an opening portion for supplying air into the exhaust casing 52 instead of or as the opening portion for an operation. For example, in the gas turbine, an exhaust gas temperature may be increased in a specific operating state (for example, a partial load operating state). In this case, cooling of the exhaust casing 52 is promoted by attaching an air supply device to the opening portion 131 and supplying external air into the exhaust casing 52. Further, opening portion 131 may be an opening portion for a purpose other than the above-mentioned two purposes.

(Auxiliary Plate Unit)

In the embodiment, the gas turbine 1 includes three auxiliary plate units 140. The auxiliary plate units 140 are reinforcement members configured to reinforce a connecting structure of the turbine casing 42 and the exhaust casing 52. One of the auxiliary plate units 140 is provided across the upper planar section 85*a* of the exhaust casing 52 and the upper planar section 85*a* of the turbine casing 42. One of the auxiliary plate units 140 is provided across the first side planar section 85*b* of the exhaust casing 52 and the first side planar section 85*b* of the turbine casing 42. One of the auxiliary plate units 140 is provided across the second side planar section 85*c* of the exhaust casing 52 and the second side planar section 85*c* of the turbine casing 42.

Each of the auxiliary plate units 140 includes an auxiliary plate 141, a plurality of first bolts 142, and a plurality of second bolts 143. The auxiliary plate 141 is a plate member parallel to the upper planar section 85*a*, the first side planar section 85*b*, or the second side planar section 85*c*. The auxiliary plate 141 covers a boundary between the exhaust casing 52 and the turbine casing 42. In addition, the auxiliary plate 141 disposed on the first side planar section 85*b* or the second side planar section 85*c* covers a boundary between the lower half casing 61 and the upper half casing 62 in addition to the boundary between the exhaust casing 52 and the turbine casing 42.

The auxiliary plate 141 includes a plurality of bolt holes facing the exhaust casing 52, and a plurality of bolt holes facing the turbine casing 42. The exhaust casing 52 includes a plurality of bolt holes 147 facing the plurality of bolt boles of the auxiliary plate 141. The turbine casing 42 includes a plurality of bolt holes 146 facing the plurality of bolt holes of the auxiliary plate 141. The first bolts 142 are inserted into the bolt holes of the auxiliary plate 141 and engaged with the bolt holes 147 of the exhaust casing 52. The second bolts 143 are inserted into the bolt holes of the auxiliary plate 141 and engaged with the bolt holes 146 of the turbine casing 42. Accordingly, the auxiliary plate 141 is fixed to the exhaust casing 52 and the turbine casing 42.

(Correction Plate Unit)

In the embodiment, the gas turbine 1 includes a correction plate unit 150. The correction plate unit 150 is an assembly jig configured to correct deformation of the exhaust casing 52 or the turbine casing 42 during a connecting work of the exhaust casing 52 and the turbine casing 42.

The correction plate unit 150 is provided across the lower planar section 85*d* of the exhaust casing 52 and the lower planar section 85*d* of the turbine casing 42. The correction plate unit 150 includes a correction plate 151, a plurality of first bolts 152, and a plurality of second bolts 153. The correction plate 151 is a plate member parallel to the lower planar section 85*d*. The correction plate 151 is thicker than the auxiliary plate 141 and bas higher rigidity than the auxiliary plate 141. The correction plate 151 covers a boundary between the exhaust casing 52 and the turbine casing 42.

The correction plate 151 includes a plurality of bolt holes facing the exhaust casing 52 and a plurality of bolt boles facing the turbine casing 42. The exhaust casing 52 includes a plurality of bolt boles 157 facing the plurality of bolt holes of the correction plate 151. The turbine casing 42 includes a plurality of bolt holes 158 facing the plurality of bolt holes of the correction plate 151. The first bolts 152 are inserted into the bolt holes of the correction plate 151 and engaged with the bolt holes 157 of the exhaust casing 52. The second bolts 153 are inserted into the bolt holes of the correction plate 151 and engaged with the bolt holes 158 of the turbine casing 42. Accordingly, the correction plate 151 is fixed to the exhaust casing 52 and the turbine casing 42.

A connecting work of the exhaust casing 52 and the turbine casing 42 is performed on the lower half casing 61 of the turbine casing 42, which is installed in advance, by lowering the lower half casing 61 of the exhaust casing 52 from a suspended state. Here, when the lower half casing 61 of the exhaust casing 52 and/or the lower half casing 61 of the turbine casing 42 are deformed, the protruding portion and the recessed portion in the spigot-joint structure 63 between the exhaust casing 52 and the turbine casing 42 may not match each other, and the lower half casing 61 of the exhaust casing 52 may not be lowered to a regular position. In this case, by fastening the second bolts 153 of the correction plate unit 150, the lower half casing 61 of the exhaust casing 52 is lowered to a regular position while correcting deformation of the lower half casing 61 of the exhaust casing 52. Accordingly, the connecting work of the exhaust casing 52 and the turbine casing 42 is smoothly performed.

Further, the reason why the lower planar section 85*d* is provided on the exhaust casing 52 may be to suppress the external dimension of the exhaust casing 52 instead of installation of the correction plate unit 150, similar to the upper planar section 85*a* or the like.

(Effects)

In order to further improve the performance of the gas turbine 1, an increase in size of the exhaust gas flow channel 72*a* is desired. However, when the exhaust gas flow channel 72*a* is increased in size, the external dimension of the exhaust casing 52 is increased, and as a result, transportability may be decreased. For example, when the external dimension of the exhaust casing 52 exceeds the external dimension LD of the transportation limit of the railroad, transportability of the exhaust casing 52 is decreased.

Here, in the embodiment, the longitudinal flanges 81 and 82 provided on the outer circumferential portion of the casing main body 70 of the exhaust casing 52 is cut out in the upper end portion Ea or the horizontal end portion Eb or Ec. According to the above-mentioned configuration, even when the exhaust gas flow channel 72*a* is increased in size, it is possible to suppress enlargement of the external dimension by cutting out a specific area of the longitudinal flanges 81 and 82 that define the external dimension of the exhaust casing 52. For example, the external dimension of the exhaust casing 52 can be within the external dimension LD of the transportation limit of the railroad by cutting out the specific area of the longitudinal flanges 81 and 82, and it is possible to avoid a decrease in transportability of the exhaust casing 52.

(Variant)

Hereinafter, some variants are described. Further, in each of the variants, configurations other than those described below are the same as the above-mentioned embodiment.

(First Variant)

Figure 11:
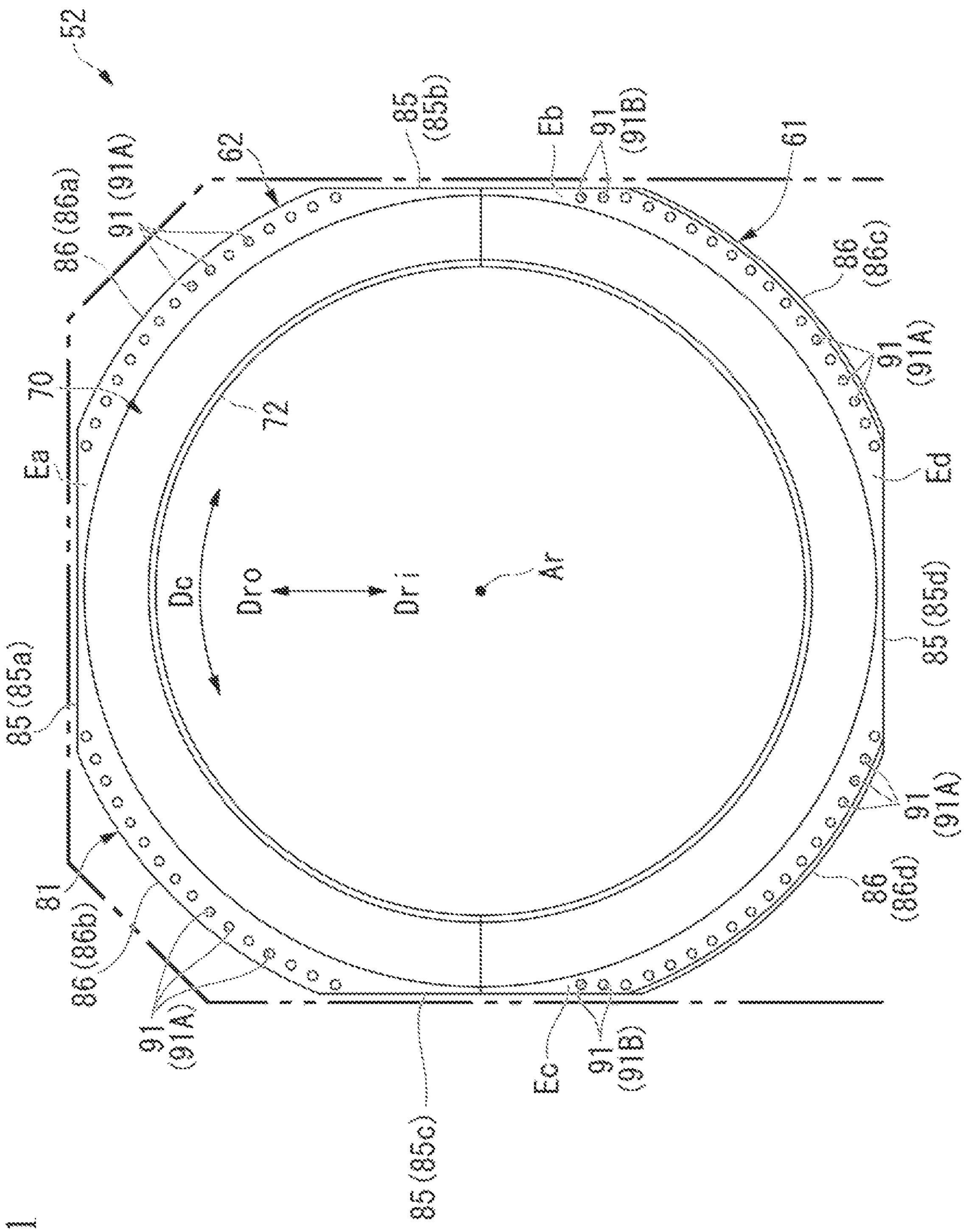
FIG. 11 is a front view showing an exhaust casing according to a first variant of the embodiment of the present disclosure.

FIG. 11 is a front view showing an exhaust casing 52 according to a first variant of the embodiment. In the first variant, the bolt holes 91B provided in the longitudinal flange 81 (the bolt holes 91 arranged along the first side planar section 85*b* or the second side planar section 85*c*) are not provided in the upper half casing 62 and are provided only in the lower half casing 61.

Figure 12:
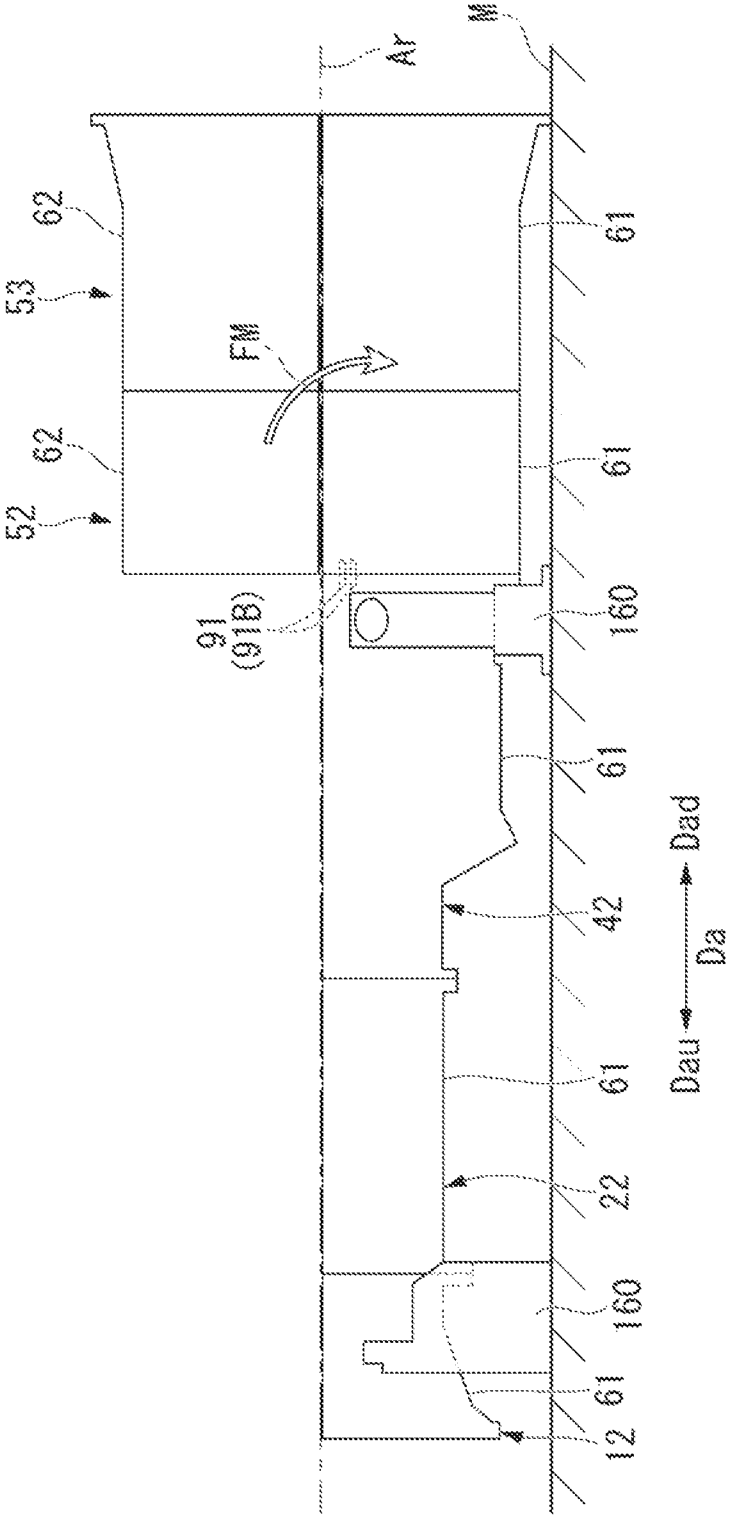
FIG. 12 is a view for describing a reason for disposition of bolt holes according to the first variant of the embodiment of the present disclosure.

FIG. 12 is a view for describing reasons of disposition of the above-mentioned bolt holes 91B. During assembly of the gas turbine 1, first, the lower half casing 61 of the intake casing 12, the lower half casing 61 of the compressor casing 22, the lower half casing 61 of the turbine casing 42, and the lower half casing 61 of the exhaust casing 52 are arranged in the axial direction Da and connected to each other. Accordingly, a lower half portion 6*a* of the gas turbine casing 6 is formed. In the gas turbine 1, after the lower half portion 6*a* of the gas turbine casing 6 is formed, the turbine rotor 41 is disposed inside the lower half portion 6*a* of the gas turbine casing 6. After that, the upper half casing 62 or the like corresponding to the lower half casing 61 of each casing is attached thereto.

Here, the gas turbine 1 includes a support section 160 configured to support the gas turbine 1 with respect to an installation surface M. The support section 160 is not provided on the exhaust casing 52 and provided on the turbine casing 42. In this case, when the upper half casing 62 of the exhaust casing 52 is attached to the lower half portion 6*a* of the gas turbine casing 6, the exhaust casing 52 is overhanging with respect to the lower half casing 61 of the turbine casing 42, and a relatively large rotation moment FM is applied to the lower half casing 61 of the gas turbine casing 6. For this reason, even when sufficient binding can be performed by only the bolts 92A in the completed state of the gas turbine casing 6, binding power between the lower half casing 61 of the turbine casing 42 and the lower half casing 61 of the exhaust casing 52 during assembly may be insufficient, Meanwhile, according to the configuration of the above-mentioned variant, since an upper section of the lower half casing 61 of the turbine casing 42 and an upper section of the lower half casing 61 of the exhaust casing 52 are coupled by the stud bolts 92B inserted into the bolt holes 91B, sufficient binding power can be provided for the rotation moment FM due to the above-mentioned overhanging. Accordingly, deformation of the gas turbine 1 during assembly can be suppressed, and assembly workability of the gas turbine 1 can be increased.

(Second Variant)

Figure 13:
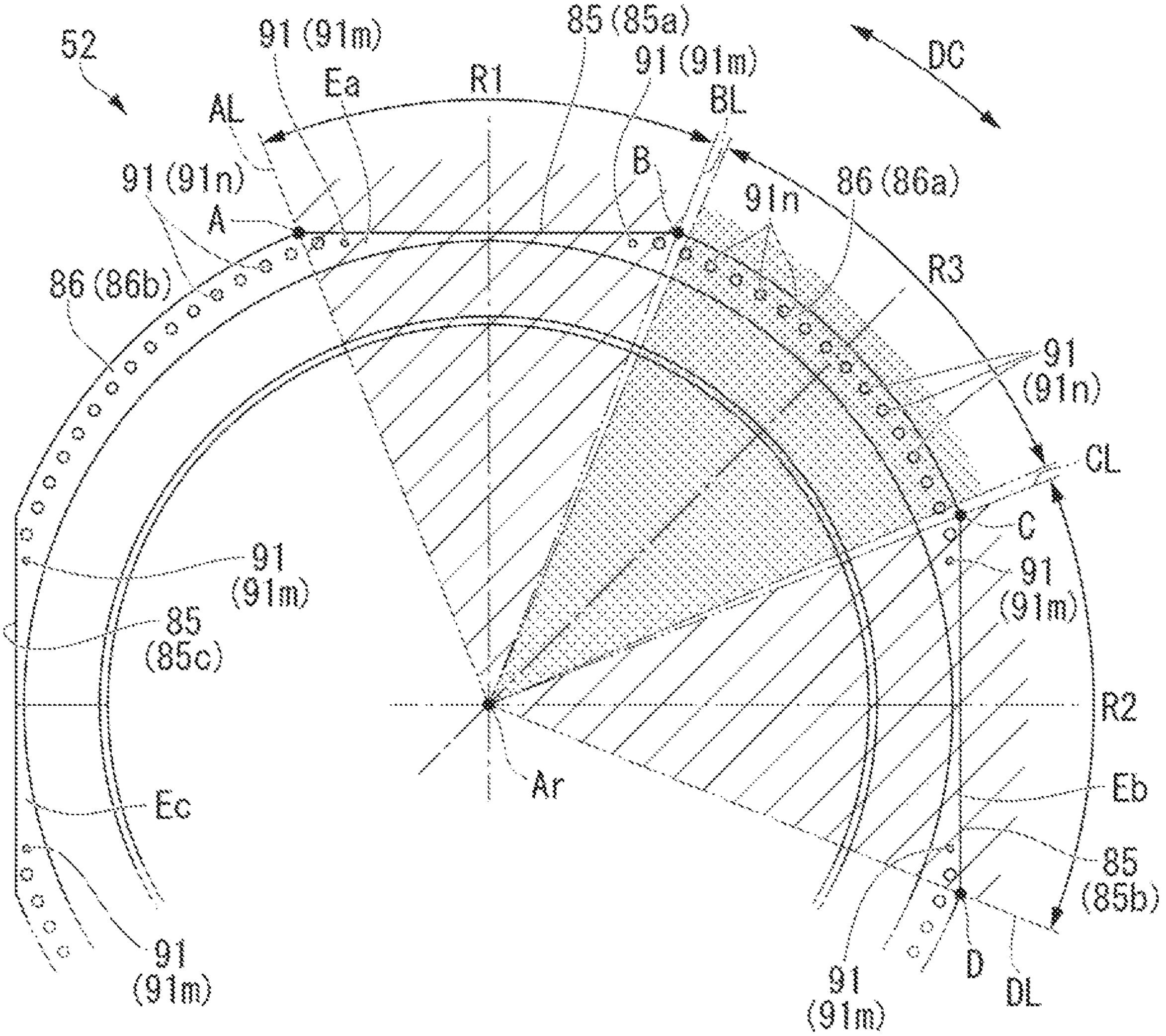
FIG. 13 is a front view showing an exhaust casing according to a second variant of the embodiment of the present disclosure.

FIG. 13 is a front view showing an exhaust casing 52 according to a second variant of the embodiment. The longitudinal flange 81 of the second variant includes the region R1, the region R2, and the region R3, like the first embodiment. Each of the region R1 and the region R2 is an example of "a first region". The region R3 is an example of "a second region". In the second variant, the plurality of bolt holes 91 includes at least one first bolt hole 91*m* disposed in the region R1 or the region R2, and a plurality of second bolt holes 91*n* disposed in the region R3. A diameter of the first bolt hole 91*m* is smaller than that of the second bolt holes 91*n*.

According to the above-mentioned configuration, the bolt holes 91 may be provided even in a region where an installation space of the bolt holes 91 is limited due to the provision of the upper planar section 85*a*, the first side planar section 85*b*, or the second side planar section 85*c* (a region where a width of the longitudinal flange 81 is small). Accordingly, connectivity between the exhaust casing 52 and another member (the turbine casing 42 or the exhaust chamber member 55) can be increased, (Third Variant)

Figure 14:
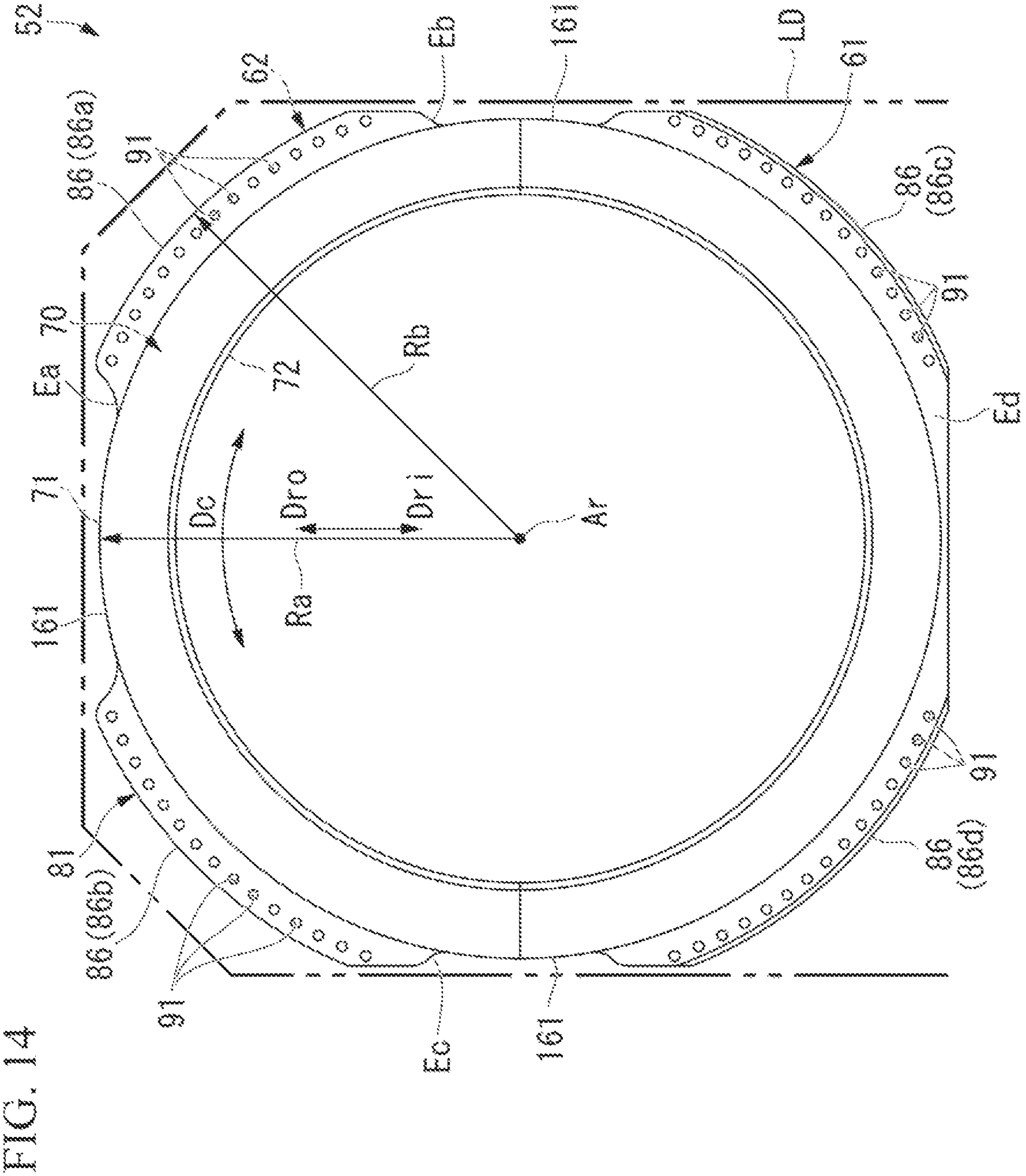
FIG. 14 is a front view showing an exhaust casing according to a third variant of the embodiment of the present disclosure.

FIG. 14 is a front view showing an exhaust casing 52 according to a third variant of the embodiment. The longitudinal flange 81 of the third variant does not include the planar section 85 in the upper end portion Ea, the first horizontal end portion Eb, or the second horizontal end portion Ec. The longitudinal flange 81 includes an are portion 161 along the outer wall section 71 of the casing main body 70 in the upper end portion Ea, the first horizontal end portion Eb. or the second horizontal end portion Ec. A radius of curvature Ra of the arc portion 161 is smaller than a radius of curvature Rb of the are portion 86. Even in the above-mentioned configuration, the external dimension of the exhaust casing 52 can be suppressed.

Hereinabove, the embodiment and some variants have been described. However, the embodiment and the variants are not limited to the above-mentioned examples. For example, the exhaust casing 52 is not divided into the lower half casing 61 and the upper half casing 62 and may have an annular configuration (a full ring configuration). In this case, since the first horizontal flange 121 and the second horizontal flange 122 are not provided, the bolt hole 91B is not a bottomed hole and may be a through-hole, and the bolt 92 attached to the bolt hole 91B is not limited to the stud bolt 92B and may be a double-nut bolt 92A.

<Supplementary Statement>

The casing and the axial flow rotating machine according to the embodiment are ascertained, for example, as follows, (1) A casing (for example, the exhaust casing 52) according to a first aspect includes the casing main body 70 configured to cover an outer circumferential side of a rotor (for example, the rotary shaft 51) that rotates around the axis Ar, and a connecting flange (for example, the longitudinal flange 81 or the longitudinal flange 82) extending from an outer circumferential portion of the casing main body 70 toward an outer circumferential side, provided along the circumferential direction De around the axis Ar and connected to a member other than the connecting flange (for example, the turbine casing 42 or the exhaust chamber member 55) in the axial direction Da that is an extension direction of the axis Ar, the connecting flange being cut out in the upper end portion Ea or the horizontal end portion Eb or Ec of the connecting flange.

According to the above-mentioned configuration, even when the exhaust gas flow channel 72*a* is increased in size, enlargement of the external dimension of the casing can be suppressed by cutting out a specific area of the connecting flange that defines the external dimension of the exhaust casing S2.

(2) The casing according to a second aspect is the casing of the above-mentioned (1), and the connecting flange is cut out in both of the upper end portion Ea and the horizontal end portion Eb or Ec.

According to the above-mentioned configuration, enlargement of the external dimension of the casing can be further suppressed.

(3) The casing according to the third aspect is the casing of the above-mentioned (1) or (2), the connecting flange includes a first planar section (for example, the upper planar section 85*a*) provided by cutting out the connecting flange in the upper end portion Ea, and provided on the upper end portion Ea along the horizontal direction.

According to the above-mentioned configuration, enlargement of the external dimension in a height direction is suppressed by cutting out the upper end portion Ba. In addition, since the upper end portion Ea includes the planar section, in comparison with the case in which the upper end portion Ea has a different shape, the external dimension of the casing in the height direction can be further reduced while simplifying the outline shape.

(4) The casing according to the fourth aspect is the casing of any one of the above-mentioned (1) to (3), and the connecting flange includes a second planar section (for example, the first side planar section 85*b* or the second side planar section 85*c*) provided by cutting out the connecting flange in the horizontal end portion Eb or Ec and provided on the horizontal end portion Eb or Ec along the vertical direction.

According to the above-mentioned configuration, since the horizontal end portion Eb or Ec is cut out, enlargement of the external dimension in the lateral width direction can be suppressed. In addition, since the horizontal end portion Eb or Ec bas the planar section, in comparison with the case in which the horizontal end portion Eb or Ec has a different shape, the external dimension of the casing in the lateral width direction can be further reduced while simplifying the outline shape.

(5) The casing according to a fifth aspect is the casing of the above-mentioned (4), the connecting flange includes the plurality of bolt holes 91 into which the bolts 92 are inserted into the axial direction Da. and two or more bolt holes 91B included in the plurality of bolt holes 91 are arranged along the second planar section in the vertical direction.

According to the above-mentioned configuration, the plurality of bolt holes 91 can be disposed also in the region that is narrowed by providing the second planar section. Accordingly, binding power between the casing and the other member can be further increased.

(6) The casing according to the sixth aspect is the casing of the above-mentioned (4) or (5), the casing includes a first casing member (for example, the lower half casing 61) and a second casing member (for example, the upper half casing 62), which are divided vertically, the first casing member includes a side flange (for example, the first horizontal flange 121) extending in the horizontal direction, the second casing member includes a side flange (for example, the second horizontal flange 122) extending in the horizontal direction and connected to the side flange of the first casing member in the vertical direction, the side flange of the first casing member includes a third planar section (for example, the first flange side planar section 121*a*) along the vertical direction, the side flange of the second casing member includes a fourth planar section (for example, the second flange side planar section 122*a*) along the vertical direction, and the second planar section is connected to the third planar section and the fourth planar section.

According to the above-mentioned configuration, the side flange of the first casing member and the side flange of the second casing member do not protrude with respect to the connecting flange. For this reason, the external dimension of the casing in the lateral width direction can be further reduced.

(7) The casing according to the seventh aspect is the casing of the above-mentioned (6), the connecting flange includes the first portion 111 outside the side flange of the first casing member and the side flange of the second casing member, and the second portion 112 overlapping the side flange of the first casing member or the side flange of the second casing member when seen in the axial direction Da, the first portion 111 includes the bolt hole 91A into which the double-nut bolt 92A is inserted, and the second portion 112 includes the bolt hole 918 into which the stud bolt 92B is inserted.

According to the above-mentioned configuration, the bolt holes 91 can be provided using the region overlapping the side flange of first casing member or the side flange of the second casing member when seen in the axial direction Da in the connecting flange. Accordingly, binding power between the casing and the other member can be further increased.

(8) The casing according to an eighth aspect is the casing of the above-mentioned (6) or (7), the third planar section or the fourth planar section includes the opening portion 131 in communication with the inside of the casing.

According to the above-mentioned configuration, works related to the casing or cooling of the casing can be performed through the opening portion provided in the side flange of the first casing member or the side flange of the second casing member.

(9) The casing according to a ninth aspect is the casing of any one of the above-mentioned (4) to (8), the second planar section includes a bolt hole 146 to which the auxiliary plate 141 is fixed across the casing and a member other than the casing.

According to the above-mentioned configuration, the auxiliary plate 141 can be attached across the casing and the other member. When the auxiliary plate 141 can be attached, reinforcement of coupling between the casing and the other member and/or at least partial closing of a gap that can be generated in the boundary between the casing and the other member can be performed.

(10) The casing according to the tenth aspect is the casing of any one of the above-mentioned (1) to (9), the connecting flange includes the plurality of bolt holes 91 into which the bolts 92 are inserted in the axial direction Da, the connecting flange includes a first region (for example, the region R1 or the region R2) including the upper end portion Ea or the horizontal end portion Eb or Ec, and a second region (for example, the region R3) outside the upper end portion Ea and the horizontal end portion Eb or Ec in the circumferential direction De, and a disposition density of the bolt boles 91 in the first region is smaller than a disposition density of the bolt holes 91 in the second region.

According to the above-mentioned configuration, the number of the bolt holes 91 is reduced near the upper end portion Ea or the horizontal end portion Bb or Ec, and the longitudinal flange 81 can be cot out more greatly. Accordingly, the external dimension of the casing can be further reduced.

(11) The casing according to an eleventh aspect is the casing of any one of the above-mentioned (1) to (10), the connecting flange includes the plurality of bolt holes 91 into which the bolts 92 are inserted in the axial direction Da, the connecting flange includes a first region (for example, the region R1 or the region R2) including the upper end portion Ea or the horizontal end portion Eb or Ec, and a second region (for example, the region R3) outside the upper end portion Ea and the horizontal end portion Eb or Ec in the circumferential direction De, the plurality of bolt holes 91 include at least one first bolt hole 91*m* disposed in the first region, and the plurality of second bolt holes 91*n* disposed in the second region, and a diameter of the first bolt hole 91*m* is smaller than that of the second bolt holes 91*n*.

According to the above-mentioned configuration, the number of the bolt holes 91 near the upper end portion Ea or the horizontal end portion Eb or Ec can be reduced, and the longitudinal flange 81 can be cut out more greatly. Accordingly, the external dimension of the casing can be further reduced.

(12) The casing according to a twelfth aspect is the casing of any one of the above-mentioned (1) to (11), the connecting flange includes the plurality of bolt holes 91 into which the bolts 92 are inserted in the axial direction Da, the plurality of bolt holes 91 includes three or more bolt holes within the first distance L1, and the bolt holes 91 are not provided over the first distance or longer in the upper end portion Ba.

According to the above-mentioned configuration, there are fewer bolt holes 91 near the upper end portion Ea, and the longitudinal flange 81 can be cut out more greatly. Accordingly, the external dimension of the casing can be further reduced.

(13) The casing according to a thirteenth aspect is the casing of any one of the above-mentioned (1) to (12), the connecting flange includes the plurality of bolt holes 91 into which the bolts 92 are inserted in the axial direction Da, the connecting flange includes a first region (for example, the region S1 or the region S2) including at least a part of the upper end portion Ea or at least a part of the horizontal end portion and having an angle range of 30 degrees in the circumferential direction De with a center line thereof along the vertical direction or the horizontal direction, and a second region (for example, the region S3) having an angle range of 30 degrees in the circumferential direction De with a center line thereof inclined at an angle of 45 degrees to the horizontal direction, and a sum of cross-sectional areas of the bolt holes 91 in the first region is smaller than a sum of cross-sectional areas of the bolt holes 91 in the second region.

According to the above-mentioned configuration, the bolt boles 91 near the upper end portion Ea or the horizontal end portion Eb or Ec can be reduced and/or decreased, and the longitudinal flange 81 can be cut out more greatly. Accordingly, the external dimension of the casing can be further reduced.

(14) An axial flow rotating machine according to a fourteenth aspect includes a casing of any one of the above-mentioned (1) to (13).

According to the above-mentioned configuration, even when the exhaust gas flow channel 72*a* is increased in size, enlargement of the external dimension of the casing can be suppressed by cutting out a specific area of the connecting flange that defines the external dimension of the casing.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims,

EXPLANATION OF REFERENCES

1 . . . Gas turbine (axial flow rotating machine)
10 . . . Suction part
12 . . . Intake casing
20 . . . Compressor
22 . . . Compressor casing
40 . . . Turbine
42 . . . Turbine casing
50 . . . Exhaust part
52 . . . Exhaust casing
53 . . . Exhaust chamber
55 . . . Exhaust chamber member
61 . . . Lower half casing (first casing member)
62 . . . Upper half casing (second casing member)
70 . . . Casing main body
81 . . . Longitudinal flange (connecting flange)
82 . . . Longitudinal flange (connecting flange)
Ea . . . Upper end portion
Eb . . . First horizontal end portion
Ec . . . Second horizontal end portion
Ed . . . Lower end portion
85*a* . . . Upper planar section (first planar section)
85*b* . . . First side planar section (second planar section)
85*c* . . . Second side planar section
85*d* . . . Lower planar section
91 . . . Bolt hole
91*m* . . . First bolt hole
91*n* . . . Second bolt hole
92 . . . Bolt
92A . . . Double-nut bolt
92B . . . Stud bolt
111 . . . First portion
112 . . . Second portion.
131 . . . Opening portion
140 . . . . Auxiliary plate unit
141 . . . Auxiliary plate
142 . . . First bolt
143 . . . Second bolt
147 . . . Bolt bole
148 . . . Bolt hole

What is claimed is:

1. A casing comprising:

a casing main body configured to cover an outer circumferential side of a rotor that rotates about an axis; and a connecting flange extending from an outer circumferential portion of the casing main body toward an outer circumferential side, provided along a circumferential direction around the axis and connected to a member other than the connecting flange in an axial direction that is an extension direction of the axis, wherein the connecting flange includes a first planar section provided on an upper end portion in a vertical direction of the connecting flange and linearly extending along a horizontal direction perpendicular to the vertical direction in a cross-sectional view viewed in the axial direction, or a second planar section provided on a horizontal end portion in the horizontal direction of the connecting flange and linearly extending along the vertical direction in the cross-sectional view viewed in the axial direction, wherein the connecting flange includes an arc portion, wherein one end of the arc portion overlaps an end of the first planar section or an end of the second planar section included in the connecting flange, and wherein the first planar section or the second planar section included in the connecting flange is located on a radial direction inner side with respect to a virtual circular outline defined by a virtual line having a same curvature as the arc portion.

2. The casing according to claim 1, wherein the connecting flange includes both of the first planar section and the second planar section.

3. The casing according to claim 1, wherein the connecting flange includes the first planar section.

4. The casing according to claim 1, wherein the connecting flange includes the second planar section.

5. The casing according to claim 4, wherein the connecting flange includes a plurality of bolt holes into which bolts are inserted in the axial direction, and two or more bolt holes included in the plurality of bolt holes are arranged along the second planar section in the vertical direction.

6. The casing according to claim 4, wherein the casing includes a first casing member and a second casing member, which are divided vertically, the first casing member includes a side flange extending in the horizontal direction, the second casing member includes a side flange extending in the horizontal direction and connected to the side flange of the first casing member in the vertical direction, the side flange of the first casing member includes a third planar section along the vertical direction, the side flange of the second casing member includes a fourth planar section along the vertical direction, and the second planar section is connected to the third planar section and the fourth planar section.

7. The casing according to claim 6, wherein the connecting flange includes a first portion outside the side flange of the first casing member and the side flange of the second casing member, and a second portion overlapping the side flange of the first casing member or the side flange of the second casing member when seen in the axial direction, the first portion includes a bolt hole into which a double-nut bolt is inserted, and the second portion includes a bolt hole into which a stud bolt is inserted.

8. The casing according to claim 6, wherein the third planar section or the fourth planar section includes an opening portion communicating with an inside of the casing.

9. The casing according to claim 4, wherein the second planar section includes a bolt hole to which an auxiliary plate is fixed across the casing and a member other than the casing.

10. The casing according to claim 1, wherein the connecting flange includes a plurality of bolt holes into which bolts are inserted in the axial direction, the connecting flange includes a first region including the upper end portion or the horizontal end portion and a second region outside the upper end portion and the horizontal end portion in the circumferential direction, and a disposition density of the bolt holes in the first region is smaller than that of the bolt holes in the second region.

11. The casing according to claim 1, wherein the connecting flange includes a plurality of bolt holes in which bolts are inserted in the axial direction, the connecting flange includes a first region including the upper end portion or the horizontal end portion and a second region outside the upper end portion and the horizontal end portion in the circumferential direction, the plurality of bolt holes include at least one first bolt hole disposed in the first region and a plurality of second bolt holes disposed in the second region, and a diameter of the first bolt hole is smaller than that of the second bolt hole.

12. The casing according to claim 1, wherein the connecting flange includes a plurality of bolt holes into which bolts are inserted in the axial direction, the plurality of bolt holes includes three or more bolt holes within a first distance, and the bolt holes are not provided over the first distance or longer in the upper end portion.

13. The casing according to claim 1, wherein the connecting flange includes a plurality of bolt holes into which bolts are inserted in the axial direction, the connecting flange includes a first region including at least a part of the upper end portion or at least a part of the horizontal end portion and having an angle range of 30 degrees in the circumferential direction with a center line thereof along the vertical direction or the horizontal direction and a second region having an angle range of 30 degrees in the circumferential direction with a center line thereof inclined at an angle of 45 degrees to the horizontal direction, and a sum of cross-sectional areas of the bolt holes in the first region is smaller than that of cross-sectional areas of the bolt holes in the second region.

14. An axial flow rotating machine comprising:

the casing according to claim 1.

* * * * *